(12) United States Patent
Colcord

(10) Patent No.: US 8,185,877 B1
(45) Date of Patent: May 22, 2012

(54) SYSTEM AND METHOD FOR TESTING APPLICATIONS

(75) Inventor: Brian Colcord, Andover, MA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1355 days.

(21) Appl. No.: 11/157,974

(22) Filed: Jun. 22, 2005

(51) Int. Cl.
*G06F 9/44* (2006.01)

(52) U.S. Cl. ......... 717/127; 717/124; 717/126; 717/131

(58) Field of Classification Search ................. None
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |

(Continued)

FOREIGN PATENT DOCUMENTS

DE 197 31 293 1/1999

(Continued)

OTHER PUBLICATIONS

Kutler, A Different Drummer on the Data Highway, American Banker, Section: No. 91, vol. 160, May 12, 1995, p. 14.

(Continued)

*Primary Examiner* — Lewis A Bullock, Jr.
*Assistant Examiner* — Mark Gooray
(74) *Attorney, Agent, or Firm* — Goodwin Procter LLP

(57) ABSTRACT

A system and method for testing at least one application is provided. The system comprises a test plan or script creation module for enabling a user to create at least one test plan or script for use in testing the at least one application. The system also comprises a test results module for initiating and determining test results associated with testing of the at least one application according to the at least one test plan or script. In some embodiments, the test results module determines: (1) baseline test results achieved by resolving the at least one test plan or script against the at least one application prior to the application being put to actual use, and (2) dynamic test results achieved by resolving the at least one test plan or script against the at least one application after the at least one application has been put to actual use. The system may also include a comparison module for comparing the dynamic test results with the baseline test results.

33 Claims, 24 Drawing Sheets

U.S. PATENT DOCUMENTS

| | | |
|---|---|---|
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,864,830 A | 1/1999 | Armetta et al. |
| RE36,116 E | 2/1999 | McCarthy |
| 5,870,718 A | 2/1999 | Spector |
| 5,870,724 A | 2/1999 | Lawlor |
| 5,870,725 A | 2/1999 | Belinger et al. |
| 5,871,398 A | 2/1999 | Schneier et al. |

| | | | | | | |
|---|---|---|---|---|---|---|
| 5,873,072 A | 2/1999 | Kight | | 6,005,939 A | 12/1999 | Fortenberry et al. |
| 5,873,096 A | 2/1999 | Lim | | 6,006,205 A | 12/1999 | Loeb et al. |
| 5,880,769 A | 3/1999 | Nemirofsky | | 6,006,249 A | 12/1999 | Leong |
| 5,883,810 A | 3/1999 | Franklin et al. | | 6,009,415 A | 12/1999 | Shurling et al. |
| 5,884,032 A | 3/1999 | Bateman | | 6,009,442 A | 12/1999 | Chen et al. |
| 5,884,270 A | 3/1999 | Walker et al. | | 6,010,404 A | 1/2000 | Walker et al. |
| 5,884,272 A | 3/1999 | Walker et al. | | 6,012,088 A | 1/2000 | Li et al. |
| 5,884,274 A | 3/1999 | Walker et al. | | 6,012,983 A | 1/2000 | Walker et al. |
| 5,884,288 A | 3/1999 | Chang | | 6,014,439 A | 1/2000 | Walker et al. |
| 5,889,863 A | 3/1999 | Weber | | 6,014,635 A | 1/2000 | Harris et al. |
| 5,892,900 A | 4/1999 | Ginter et al. | | 6,014,636 A | 1/2000 | Reeder |
| 5,898,780 A | 4/1999 | Liu et al. | | 6,014,638 A | 1/2000 | Burge et al. |
| 5,899,982 A | 5/1999 | Randle | | 6,014,641 A | 1/2000 | Loeb et al. |
| 5,903,881 A | 5/1999 | Schrader | | 6,014,645 A | 1/2000 | Cunningham |
| 5,909,486 A | 6/1999 | Walker et al. | | 6,016,810 A | 1/2000 | Ravenscroft |
| 5,910,988 A | 6/1999 | Ballard | | 6,018,714 A | 1/2000 | Risen, Jr. |
| 5,913,202 A | 6/1999 | Motoyama | | 6,018,718 A | 1/2000 | Walker et al. |
| 5,914,472 A | 6/1999 | Foladare et al. | | 6,024,640 A | 2/2000 | Walker et al. |
| 5,915,244 A | 6/1999 | Jack et al. | | 6,026,398 A | 2/2000 | Brown et al. |
| 5,918,214 A | 6/1999 | Perkowski | | 6,026,429 A | 2/2000 | Jones et al. |
| 5,918,217 A | 6/1999 | Maggioncalda | | 6,032,134 A | 2/2000 | Weissman |
| 5,918,239 A | 6/1999 | Allen et al. | | 6,032,147 A | 2/2000 | Williams et al. |
| 5,920,847 A | 7/1999 | Kolling et al. | | 6,038,547 A | 3/2000 | Casto |
| 5,921,864 A | 7/1999 | Walker et al. | | 6,038,552 A | 3/2000 | Fleischl et al. |
| 5,923,763 A | 7/1999 | Walker et al. | | 6,042,006 A | 3/2000 | Van Tilburg et al. |
| 5,926,796 A | 7/1999 | Walker et al. | | 6,044,362 A | 3/2000 | Neely |
| 5,926,812 A | 7/1999 | Hilsenrath | | 6,045,039 A | 4/2000 | Stinson et al. |
| 5,930,764 A | 7/1999 | Melchione | | 6,049,778 A | 4/2000 | Walker et al. |
| 5,933,816 A | 8/1999 | Zeanah | | 6,049,782 A | 4/2000 | Gottesman et al. |
| 5,933,817 A | 8/1999 | Hucal | | 6,049,835 A | 4/2000 | Gagnon |
| 5,933,823 A | 8/1999 | Cullen | | 6,055,637 A | 4/2000 | Hudson et al. |
| 5,933,827 A | 8/1999 | Cole | | 6,061,665 A | 5/2000 | Bahreman |
| 5,940,812 A | 8/1999 | Tengel et al. | | 6,064,987 A | 5/2000 | Walker et al. |
| 5,943,656 A | 8/1999 | Crooks | | 6,065,120 A | 5/2000 | Laursen et al. |
| 5,944,824 A | 8/1999 | He | | 6,065,675 A | 5/2000 | Teicher |
| 5,945,653 A | 8/1999 | Walker et al. | | 6,070,147 A | 5/2000 | Harms et al. |
| 5,946,388 A | 8/1999 | Walker et al. | | 6,070,153 A | 5/2000 | Simpson |
| 5,947,747 A | 9/1999 | Walker et al. | | 6,070,244 A | 5/2000 | Orchier et al. |
| 5,949,044 A | 9/1999 | Walker et al. | | 6,073,105 A | 6/2000 | Sutcliffe et al. |
| 5,949,875 A | 9/1999 | Walker et al. | | 6,073,113 A | 6/2000 | Guinan |
| 5,950,173 A | 9/1999 | Perkowski | | 6,075,519 A | 6/2000 | Okatani et al. |
| 5,950,174 A | 9/1999 | Brendzel | | 6,076,072 A | 6/2000 | Libman |
| 5,950,206 A | 9/1999 | Krause | | 6,081,790 A | 6/2000 | Rosen |
| 5,952,639 A | 9/1999 | Ohki | | 6,081,810 A | 6/2000 | Rosenzweig et al. |
| 5,952,641 A | 9/1999 | Korshun | | 6,085,168 A | 7/2000 | Mori et al. |
| 5,953,710 A | 9/1999 | Fleming | | 6,088,444 A | 7/2000 | Walker et al. |
| 5,956,695 A | 9/1999 | Carrithers et al. | | 6,088,451 A | 7/2000 | He et al. |
| 5,958,007 A | 9/1999 | Lee et al. | | 6,088,683 A | 7/2000 | Jalili |
| 5,960,411 A | 9/1999 | Hartman et al. | | 6,088,686 A | 7/2000 | Walker et al. |
| 5,961,593 A | 10/1999 | Gabber et al. | | 6,088,700 A | 7/2000 | Larsen et al. |
| 5,963,635 A | 10/1999 | Szlam et al. | | 6,091,817 A | 7/2000 | Bertina et al. |
| 5,963,925 A | 10/1999 | Kolling et al. | | 6,092,196 A | 7/2000 | Reiche |
| 5,963,952 A | 10/1999 | Smith | | 6,095,412 A | 8/2000 | Bertina et al. |
| 5,963,953 A | 10/1999 | Cram et al. | | 6,098,070 A | 8/2000 | Maxwell |
| 5,966,695 A | 10/1999 | Melchione et al. | | 6,101,486 A | 8/2000 | Roberts et al. |
| 5,966,699 A | 10/1999 | Zandi | | 6,104,716 A | 8/2000 | Crichton et al. |
| 5,967,896 A | 10/1999 | Jorasch et al. | | 6,105,012 A | 8/2000 | Chang et al. |
| 5,969,318 A | 10/1999 | Mackenthun | | 6,105,865 A | 8/2000 | Hardesty |
| 5,970,143 A | 10/1999 | Schneier et al. | | 6,111,858 A | 8/2000 | Greaves et al. |
| 5,970,470 A | 10/1999 | Walker et al. | | 6,112,181 A | 8/2000 | Shear et al. |
| 5,970,478 A | 10/1999 | Walker et al. | | 6,115,690 A | 9/2000 | Wong |
| 5,970,482 A | 10/1999 | Pham | | 6,119,093 A | 9/2000 | Walker et al. |
| 5,970,483 A | 10/1999 | Evans | | 6,119,099 A | 9/2000 | Walker et al. |
| 5,978,467 A | 11/1999 | Walker et al. | | 6,128,599 A | 10/2000 | Walker et al. |
| 5,983,196 A | 11/1999 | Wendkos | | 6,128,602 A | 10/2000 | Northington et al. |
| 5,987,434 A | 11/1999 | Libman | | 6,131,810 A | 10/2000 | Weiss et al. |
| 5,987,498 A | 11/1999 | Athing et al. | | 6,134,549 A | 10/2000 | Regnier et al. |
| 5,991,736 A | 11/1999 | Ferguson et al. | | 6,134,592 A | 10/2000 | Montulli |
| 5,991,738 A | 11/1999 | Ogram | | 6,135,349 A | 10/2000 | Zirkel |
| 5,991,748 A | 11/1999 | Taskett | | 6,138,106 A | 10/2000 | Walker et al. |
| 5,991,751 A | 11/1999 | Rivette et al. | | 6,138,118 A | 10/2000 | Koppstein et al. |
| 5,991,780 A | 11/1999 | Rivette | | 6,141,651 A | 10/2000 | Riley et al. |
| 5,995,948 A | 11/1999 | Whitford | | 6,141,666 A | 10/2000 | Tobin |
| 5,995,976 A | 11/1999 | Walker et al. | | 6,144,946 A | 11/2000 | Iwamura |
| 5,999,596 A | 12/1999 | Walker et al. | | 6,144,948 A | 11/2000 | Walker et al. |
| 5,999,907 A | 12/1999 | Donner | | 6,145,086 A | 11/2000 | Bellemore et al. |
| 6,000,033 A | 12/1999 | Kelley et al. | | 6,148,293 A | 11/2000 | King |
| 6,001,016 A | 12/1999 | Walker et al. | | 6,151,584 A | 11/2000 | Papierniak et al. |
| 6,003,762 A | 12/1999 | Hayashida | | 6,154,750 A | 11/2000 | Roberge et al. |

| | | |
|---|---|---|
| 6,154,879 A | 11/2000 | Pare et al. |
| 6,161,182 A | 12/2000 | Nadooshan |
| 6,164,533 A | 12/2000 | Barton |
| 6,170,011 B1 | 1/2001 | Macleod Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,301,701 B1 * | 10/2001 | Walker et al. ................ 717/125 |
| 6,308,273 B1 | 10/2001 | Goertzel et al. |
| 6,308,274 B1 | 10/2001 | Swift |
| 6,311,275 B1 | 10/2001 | Jin et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditisky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 | 9/2002 | Ballard |
| 6,453,353 B1 | 9/2002 | Win et al. |
| 6,460,141 B1 | 10/2002 | Olden |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,592,044 B1 | 7/2003 | Wong et al. |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,668,322 B1 | 12/2003 | Wood et al. |
| 6,687,222 B1 | 2/2004 | Albert et al. |
| 6,718,482 B2 | 4/2004 | Sato et al. |
| 6,718,535 B1 | 4/2004 | Underwood |
| 6,725,269 B1 | 4/2004 | Megiddo |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,766,370 B2 | 7/2004 | Glommen et al. |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,820,202 B1 | 11/2004 | Wheeler et al. |
| 6,832,202 B1 | 12/2004 | Schuyler et al. |
| 6,856,970 B1 | 2/2005 | Campbell et al. |
| 6,892,231 B2 | 5/2005 | Jager |
| 6,907,566 B1 | 6/2005 | McElfresh et al. |
| 6,925,481 B2 | 8/2005 | Singhal et al. |
| 6,983,421 B1 | 1/2006 | Lahti et al. |
| 7,020,696 B1 | 3/2006 | Perry et al. |
| 2001/0012974 A1 | 8/2001 | Mahaffey |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077978 A1 | 6/2002 | O'Leary et al. |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0152163 A1 | 10/2002 | Bezos et al. |
| 2002/0165949 A1 | 11/2002 | Na et al. |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Ylonen et al. |
| 2003/0018915 A1 | 1/2003 | Stoll |
| 2003/0023880 A1 | 1/2003 | Edward et al. |
| 2003/0034388 A1 | 2/2003 | Routhenstein et al. |
| 2003/0037142 A1 | 2/2003 | Munger et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0145252 A1 * | 7/2003 | Grey et al. ................ 714/38 |
| 2003/0154403 A1 | 8/2003 | Keinsley et al. |

| | | | |
|---|---|---|---|
| 2003/0159072 | A1 | 8/2003 | Bellinger et al. |
| 2003/0163733 | A1 | 8/2003 | Barriga-Caceres et al. |
| 2003/0177067 | A1 | 9/2003 | Cowell et al. |
| 2003/0191549 | A1 | 10/2003 | Otsuka et al. |
| 2004/0031856 | A1 | 2/2004 | Atsmon et al. |
| 2004/0117409 | A1 | 6/2004 | Scahill et al. |
| 2005/0080747 | A1 | 4/2005 | Anderson et al. |
| 2005/0082362 | A1 | 4/2005 | Anderson et al. |
| 2005/0086160 | A1 | 4/2005 | Wong et al. |
| 2005/0086177 | A1 | 4/2005 | Anderson et al. |
| 2005/0097515 | A1* | 5/2005 | Ribling .................. 717/124 |
| 2005/0278641 | A1 | 12/2005 | Mansour et al. |

FOREIGN PATENT DOCUMENTS

| | | |
|---|---|---|
| EP | 0 884 877 | 12/1998 |
| EP | 0 917 119 | 5/1999 |
| EP | 1 022 664 | 7/2000 |
| JP | H10-187467 | 7/1998 |
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
Java, Banking on Java(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 1999, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent. idg, p. 1 of 5, retrieved from the internet on Nov. 28, 2005.
Java, Java (TM) Technology in the Real World, java.sun.com, May 21, 1999.
Java, Java(TM) Remote Method Invocation (RMI) Interface, java.sun.com, May 21, 1999.
Java, Java(TM) Servlet API, java.sun.com, May 21, 1999.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.

Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: for Engineers by Engineers, Thomas Publishing Company, Apr. 26, 1999.
Java, Staying in Touch with JNDI, java.sun.com, May 21, 1999.
Summary of the at Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
Java, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, Mar. 1, 1995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.

* cited by examiner

Account Registration Page

Account Type:  ○ Individual
               ○ Joint

First Name
Last Name
Home Address
City
State

Send

Click here to Use Stored Address

| | A | B | C |
|---|---|---|---|
| 1 | Test Condition: | Individual Cash Account Setup | |
| 2 | Test ID #: | 2 | |
| 3 | Type Of Test: | Acceptance | |
| 4 | Application: | JPMI Accounts Track | |
| 5 | Pre-Requisite: | none | |
| 6 | Estimated Execution Time: | 0 | |
| 7 | Author: | Brian Colcord | |
| 8 | Last Updated: | 12/15/2003 | |
| 9 | Creation Date: | 12/15/2003 | |
| 10 | Reviewed: | Yes | |
| 11 | Priority: | 1 | |
| 12 | Browser: | | |
| 13 | OS: | | |
| 14 | Tester: | QTP | |
| 15 | Total Test Cases: | 0 | |
| 16 | Test Cases Executed Time: | 0 | |
| 17 | Test Cases Remaining Time: | 0 | |
| 18 | Estimated Test Cases: | | |
| 19 | Requirement Coverage: | | |

Figure 11

| | A | B | C | D | E |
|---|---|---|---|---|---|
| 1142 | Step | Object Name: (Cntl-z-Filter) | Method | Parameter-Value(s) | Description |
| 1143 | | | BeginScript | | |
| 1144 | | https://uat.jpmorganinvest.com/images/open_s_jpmi_account.gif_1 | WebAreaClick | | Select open account from homepage. |
| 1145 | | accountType_2 | WebRadioGroupSelect | Individual | This last creates a individual ownership account. |
| 1146 | | Open an account_2 | WebImageClick | | |
| 1147 | | Open an account_3 | WebImageClick | | Review and gather documents. |
| 1148 | | owner.firstName_4 | WebEditSet | firstnameb | Enter the personal information. |
| 1149 | | owner.midinitial_4 | WebEditSet | s | |
| 1150 | | owner.lastName_4 | WebEditSet | lastnameb | |
| 1151 | | owner.ssn1_4 | WebEditSetRandValue | SSN1 | Random generated number |
| 1152 | | owner.ssn2_4 | WebEditSetRandValue | SSN2 | Random generated number |
| 1153 | | owner.ssn3_4 | WebEditSetRandValue | SSN3 | Random generated number |
| 1154 | | owner.dd_4 | WebEditSet | 12 | |
| 1155 | | owner.mm_4 | WebEditSet | 14 | |
| 1156 | | owner.yyyy_4 | WebEditSet | 1961 | |
| 1157 | | permAddress.street1_4 | WebEditSet | T | G |
| 1158 | | permAddress.street2_4 | WebEditSet | ikslkjdf | |
| 1159 | | permAddress.city_4 | WebEditSet | sdfsdf | |
| 1160 | | permAddress.zipCode_4 | WebEditSet | 03100 | |
| 1161 | | permAddress.zipPlus_4 | WebEditSet | | |
| 1162 | | mailAddress.street1_4 | WebEditSet | lkjklkjflk | |
| 1163 | | mailAddress.street2_4 | WebEditSet | sfsdfsdf | |
| 1164 | | mailAddress.city_4 | WebEditSet | sdfsdfsdf | |
| 1165 | | mailAddress.zipCode_4 | WebEditSet | 03811 | |
| 1166 | | mailAddress.zipPlus_4 | WebEditSet | | |
| 1167 | | phones.daytimePhone.areaC | WebEditSet | 603 | |

| Step | Object Name (Ctrl-z Filter) | Method | Parameter Value(s) | Description |
|---|---|---|---|---|
| | | BeginScript | | |
| | https://uat.jpmorganinvest.com/images/open_a_jpmi_account.gif_1 | WebAreaClick | | Select open account from homepage. |
| | accountType_2 | WebRadioGroupSelect | Individual | This test creates a individual ownership account. |
| | Open an account_2 | WebImageClick | | |
| | Open an account_3 | bbImageClick | | Review and gather documents. |
| | Home_3 | bbEditSet | | |
| | About us_3 | bbEditSet | firstnameb | Enter the personal information. |
| | Contact us_3 | bbEditSet | b | |
| | Help_3 | bbEditSet | lastnameb | |
| | Site map_3 | bbEditSetRandValue | SSN1 | Random generated number |
| | Log on_3 | bbEditSetRandValue | SSN2 | Random generated number |
| | Accounts | WebEditSetRandValue | SSN3 | Random generated number |
| | owner.ssn3_4 | WebEditSet | 12 | |
| | owner.mm_4 | WebEditSet | 14 | |
| | owner.dd_4 | WebEditSet | 1961 | |
| | owner.yyyy_4 | WebEditSet | j | |
| | permAddress.street1_4 | WebEditSet | lkslkjsdf | G |
| | permAddress.street2_4 | WebEditSet | sdfsdf | |
| | permAddress.city_4 | WebEditSet | b3100 | |
| | permAddress.zipCode_4 | WebEditSet | | |
| | permAddress.zipPlus_4 | WebEditSet | lkjklkjlk | |
| | mailAddress.street1_4 | WebEditSet | sfsdfsdf | |
| | mailAddress.street2_4 | WebEditSet | sdfsdfsdf | |
| | mailAddress.city_4 | WebEditSet | 03811 | |
| | mailAddress.zipCode_4 | WebEditSet | | |
| | mailAddress.zipPlus_4 | WebEditSet | | |
| | phones.daytimePhone.areaC ode_4 | WebEditSet | 603 | |

| | Methods: | Description | Object | Example Method | Parameters |
|---|---|---|---|---|---|
| 29 | WebAreaClick | Click on the web area. | https://ual.jpmorganinvest.com/images/open_a_jpmi_account.gif_1 | WebAreaClick | |
| 30 | WebBrowserNavigate | Navigate to the given URL. | creationtime:=1 | WebBrowserNavigate | https://ual.jpmorganinvest.com/downloads/margin_disc_st ate.pdf |
| 31 | WebCaptureErrors | Capture fields on the screen that have bold red attributes. | Screen: PersonalInformation | WebCaptureErrors | |
| 32 | WebCaptureSource | Capture the HTML on the given page. | Screen: PersonalInformation | WebCaptureErrors | |
| | | Capture a dynamic string to a variable. The parameter are:<br>1 - Start string<br>2 - End string<br>3 - Variable name in VarSheet to store variable. | | | |
| 33 | WebCaptureString | | Screen: AccountApplication<br>creationtime:=1 | WebCaptureString | Your account number is:,If you,SaveAcco unt |
| 34 | WebCaptureText | Capture the text for objects on the screen. | iagree1_10 | WebCaptureText | |
| 35 | WebCheckBoxSet | Set the checkbox ON or OFF | answer3_12 | WebCheckBoxSet | ON |
| 36 | WebEditSet | Set the text in the edit field | | WebEditSet | cc |
| | | Set the string to a Axxxxxxxx2 field depending on the strings max field length. Set the string to a random value. The random value will be input to the editbox object.<br>The predefined list of random values are:<br>"SSN1"<br>"SSN2" | | | |
| 37 | WebEditSetMaxString | | useid_11 | WebEditSetMaxString | 7 |

Figure 18

SYSTEM AND METHOD FOR TESTING APPLICATIONS

RELATED APPLICATIONS

This patent application is related to a U.S. utility patent application titled "Method to Measure Stored Procedure Execution Statistics," filed Jan. 14, 2003, assigned Ser. No. 10/341,841, and published on May 6, 2004 as Publication No. US 2004/0088278A1.

FIELD OF THE INVENTION

The present invention is directed to systems and methods for testing applications, and more particularly, to systems and methods for automatically testing online applications such as web sites or pages.

BACKGROUND OF THE INVENTION

Quality assurance (QA) of Internet web sites and pages is becoming increasingly crucial. As users becoming more comfortable interacting and conducting commercial transactions online, companies must ensure that their online content runs smoothly, efficiently and reliably. Recurring problems with a vendor's web site may lead to lost opportunities, and, worse yet, gains to the competition. With online offerings rapidly growing, it is paramount that quality assurance efforts be both comprehensive and reliable.

Regression testing is a type of QA testing currently performed on web-hosted applications. Regression tests determine whether data or objects associated with a particular web site screen function properly to produce correct result(s). An object may comprise, for example, any portion of the web site or page that receives information a user, provides information to a user, or produces or is used to produce a specific result. Examples include drop-down menus, radio buttons, icons, hyperlinks, search or text boxes, and other like screen elements. For example, a web page that permits a user to open a trading account may comprise objects that query a registrant for his name, address, telephone number, account type, and other relevant information. Ideally, the objects should perform properly no matter what data or information the user/registrant provides. Thus, a registrant should be able to register regardless of whether the registrant is from Florida, New York or Virginia, for example. Regression testing may reveal, for example, that the registration process fails every time a user from New York attempts to register, signaling a problem with the particular object that queries the registrant for his state of residence. Regression testing may also reveal that particular data—such as the registrant's name, for example—has changed. Other screen data and objects may be tested as well.

Currently, several testing tools are available that test an application's performance and ability to produce intended results. Some of these tools require the tester to manually input lines of code and data that comprise navigation steps that specifically test data or objects of the application, such as performance of drop-down menus, radio buttons, and icons, for example. Each line of code defines a particular action to be performed and corresponding data, values, or parameters associated with the action. The process, however, is laborious, time-consuming, and requires the tester to have substantial programming skills. Other systems and tools facilitate the process by providing a spreadsheet interface that enables a tester to perform many of the data entry and coding steps without possessing particular programming knowledge. Data and information entered onto the spreadsheet in one format may then be converted to an appropriate format compatible with the test tool that interfaces with the application and performs the test.

While existing systems and methods for testing applications have been effective in identifying flaws with an application, they nonetheless suffer from several notable drawbacks. First, current systems and methods do not enable a tester to rapidly and dynamically define test plans or scripts that can be stored for future use, modified or revised to accommodate changes in an application, and which can be used to dynamically capture results that likewise may be stored for subsequent access or use. Second, current systems and methods do not enable the generation of test results that can be dynamically compared throughout the lifespan of the application, such as, for example, baseline test results that can be used to dynamically measure or gauge subsequent test results. Third, current systems do not enable a tester to define objects during the test plan or script creation process in an efficient and dynamic manner, such as by dynamically determining the objects and associated parameters or values associated with an application.

These and other problems exist.

SUMMARY OF THE INVENTION

An object of the present invention is to overcome the aforementioned and other drawbacks existing in prior art systems and methods.

Another object of the present invention is to provide a system and method that facilitates the creation of test plans or scripts.

Another object of the present invention is to provide a system and method that rapidly and dynamically defines test cases.

Yet another object of the present invention is to provide a system and method that enables a user to parameterize dynamic data or objects so that regression testing can focus on appropriate data or objects.

Another object of the present invention is to provide a system and method that defines objects (e.g., drop-down menu on a web page) associated with an application, and that identifies parameters or values associated with the objects.

According to various embodiments, the systems and methods described herein comprise two components: (1) a test control module that, among other things, creates test plans or scripts (e.g., steps to be performed during a test), conducts baseline and regression testing of an application and defines objects and parameters or values associated with an application, and (2) a testing tool that receives instructions from the test control module and interacts directly with the application to carry out the testing steps designated by test control module. In some embodiments, the test control module may also comprise a spreadsheet document or interface that provides a user with a non-programming interface to the testing tool.

In some embodiments, the systems and methods described herein may be used to generate test cases (e.g., test results and statistics) by resolving test plans or scripts against applications being tested. Test cases consist of data and information generated by the testing tool as a result of resolving a test plan or script against a particular application. In some embodiments, navigation steps of the test plan or script or commands (e.g., capture web text) are taken from the spreadsheet document or interface and interpreted by the testing tool to create and capture test cases. Generated test cases may be stored for future access and use, such as comparative testing. In some embodiments, a test case name (e.g., identification number)

may be dynamically associated with the test case so that it may be stored and recalled for future use.

In some embodiments, pass/fail data, and other test statistics, may be presented to the user/tester through a spreadsheet document or interface or other presentation device or format. Other types of test result data may include capturing screen text, objects on the screen, existence of error messages, and contents of list boxes, capturing screen text or objects on the screen, existence of error messages and contents, of list boxes, for example. Once a test case is generated and captured by the testing tool, it may be presented to the user through a spreadsheet document or interface and/or stored for future use.

In some embodiments, the systems and methods described herein enable a user to test various features and functionality of an online application or content, such as a web site or page. For example, the systems and methods may enable a user to identify errors in web site or page functionality before and after the web site or page is put to actual use (e.g., uploaded to a server for commercial or public use), or following revisions or changes in web site content or functionality. The systems and methods may test the operation of a web page or site to make sure that data and objects associated with page or site work properly and/or produce the intended result(s). For example, the systems and methods described may be used to verify that a web site or page dedicated to registering users works properly regardless of the data and information provided by the user during the registration process. Similarly, the systems and methods described herein may verify the accuracy of content presented through a web site or page, such as the content of a posted pdf document, for example.

One aspect of the systems and methods described herein enables a user to perform comparative testing of an application, such as throughout the application's lifespan, periodically, or upon request. For example, the systems and methods may generate baseline test results comprising baseline measures against which subsequent testing may be measured or gauged. For example, baseline results may be obtained before an application is launched or put to actual use, or whenever the application is known to be functioning properly. The baseline results may then be assigned a test case identifier and stored in a file system or storage device and thereafter accessed for comparison purposes, e.g. compared with subsequent or regression test results performed while the application is in use. By comparing regression test results with baseline test results, a user may better monitor applications to more effectively identify flaws or failure in content or processing.

In some embodiments, test case data may be captured while a script is running. For example, if a test plan performs a test case action like WebCaptureText (e.g., an action that captures the text from a web page or site), a test case ID may be generated and the text is captured. In some embodiments, the test case ID may comprise a sequential number that is generated each time the test function is executed. The data may then be captured to a Baseline worksheet, if results comprise the desired baseline, or to a regression results worksheet. At the completion of the automated script, the baseline results may be compared to the regression results. At this point, pass/fail results may be generated and presented to the user. The benefits of such a process include (1) the ability to view the results in a spreadsheet or worksheet, (2) the automatic and dynamic generation of test case IDs, and (3) the creation of test cases before the software or application to test is available. In some embodiments, a tester may be presented with various statistics on the number of pass/fail test cases.

In another aspect, the systems and methods described herein may also comprise an extended screen map feature that may be used to automatically identify and define any number of objects (and associated parameters associated with a web site or page. The objects identified may then be maintained in an object map that may be stored for future use (e.g., in connection with future testing of the application.) In some embodiments, the systems and methods described herein may dynamically capture all objects associated with an application as the user navigates throughout the application. Captured objects would then be stored in an object map that may be stored and referenced as needed. The extended screen map feature may allow the generation of template test scripts that improve overall productivity. A template may be generated that the tester can customize as needed, as opposed to having to recreate a template every time a test is conducted. The extended screen map may also provide coverage analysis so that a tester can make sure all fields have been tested in the script(s).

In yet another aspect, the systems and methods described herein may also perform a page validation technique that simplifies the process of synchronizing test scripts when navigating between screens. For example, the testing tool may wait for the screen to fully load and page validation object to be visible before proceeding. Current commercially available test tools require sophisticated coding for this step to be performed. In some embodiments, the page validation technique may provide the ability to validate and wait for the appropriate web page to display by using a single definition in the object map. In some embodiments, the technique allows for definition of the page validation step during the mapping of the screen.

According to one embodiment of the invention, a system for testing at least one application is provided. The system comprises a test plan or script creation module for enabling a user to create at least one test plan or script for use in testing the at least one application; a test results module for initiating and determining test results associated with testing of the at least one application according to the at least one test plan or script, the test results module determining: (1) baseline test results achieved by resolving the at least one test plan or script against the at least one application, and (2) regression test results achieved by resolving the at least one test plan or script against the at least one application. The system also comprises a comparison module for comparing the regression test results with the baseline test results; and a parameterization module for parameterizing dynamic data or objects associated with the at least one application, the dynamic data or objects being determined by the comparison.

In another embodiment of the invention, a method for testing at least one application is provided. The method comprises the steps of determining at least one test plan or script for conducting a test on at least one application; conducting a baseline test of the at least one application according to the at least one test plan or script, the baseline test being performed to obtain baseline results relating to the at least one application; conducting a regression test of the at least one application according to the at least one test plan or script, the regression testing being performed to obtain regression results relating to the at least one application; comparing the regression results with the baseline results; and receiving a parameterization signal from a user parameterizing dynamic data or objects associated with the at least one application, the dynamic data or object being determined by the comparison.

In yet another embodiment of the invention, a system for defining an object for use in a test plan or script is provided. The system comprises an object determination module for determining at least one object associated with at least one application; an object value determination module for determining at least one value or parameter associated with the at least one object; and an object map creation module for creating an object map of the at least one object and at least one value or parameter associated with the at least one application.

In yet another embodiment of the invention, a system for testing at least one application is provided. The system comprises a spreadsheet module for receiving and presenting test data and information from and to a user in a first format. The spreadsheet module comprises a test plan or script creation module for enabling the user to create at least one test plan or script for use in testing the at least one application, the at least one test plan or script comprising at least one object, at least one method, and at least one parameter, the at least one test plan or script being based on data and information received from the user by the spreadsheet module. The test plan or script creation module comprises an object module for defining at least one object associated with the at least one application. The object module comprises an object determination module for identifying or determining at least one object associated with the at least one application; and an object value determination module for identifying or determining at least one object value or parameter associated with the at least one object. The test plan or script creation module also comprises an object map creation module for creating object maps; and a method module for defining at least one method for testing the at least one object associated with the at least one application. The system also comprises a test results module for determining results associated with testing of the at least one application, and for presenting the test results to the user through the spreadsheet module. The test results module comprises a baseline test results module for determining baseline test results associated with the at least one application; a regression test results module for determining regression test results; a comparison module for comparing the regression test results with the baseline test results; and a parameterization module for parameterizing dynamic data or objects associated with the at least one application, the dynamic data or objects being determined by the comparison. The test results module may also comprise a test case ID module for dynamically associating test case identifiers with test cases. The system may also comprise an interpreter module for converting the test data and information between the first and a second format. The system may also comprise a test tool interface module for interfacing with a testing tool and for presenting and receiving test data and information from and to the testing tool in the second format, the testing tool interfacing with the application to conduct the test.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 5 illustrates one embodiment of a screen interface being tested using the various systems and methods described herein.

FIG. 11 illustrates an illustrative interface comprising a table of contents for a particular test plan or script, according to one embodiment of the invention FIG. 12 illustrates an illustrative interface sowing a particular test plan or script, according to one embodiment of the invention.

FIG. 13 illustrates an illustrative interface associated showing revisions to a particular test plan or script, according to one embodiment of the invention.

FIG. 14 illustrates an illustrative interface associated showing revisions to a particular test plan or script, according to one embodiment of the invention.

FIG. 15 illustrates an illustrative interface showing test results according to a particular test plan or script, according to one embodiment of the invention.

FIG. 17 illustrates an illustrative interface showing an object map, according to one embodiment of the invention.

FIG. 18 illustrates an illustrative interface showing a method map, according to one embodiment of the invention.

DETAILED DESCRIPTION OF THE INVENTION

Figure 1:
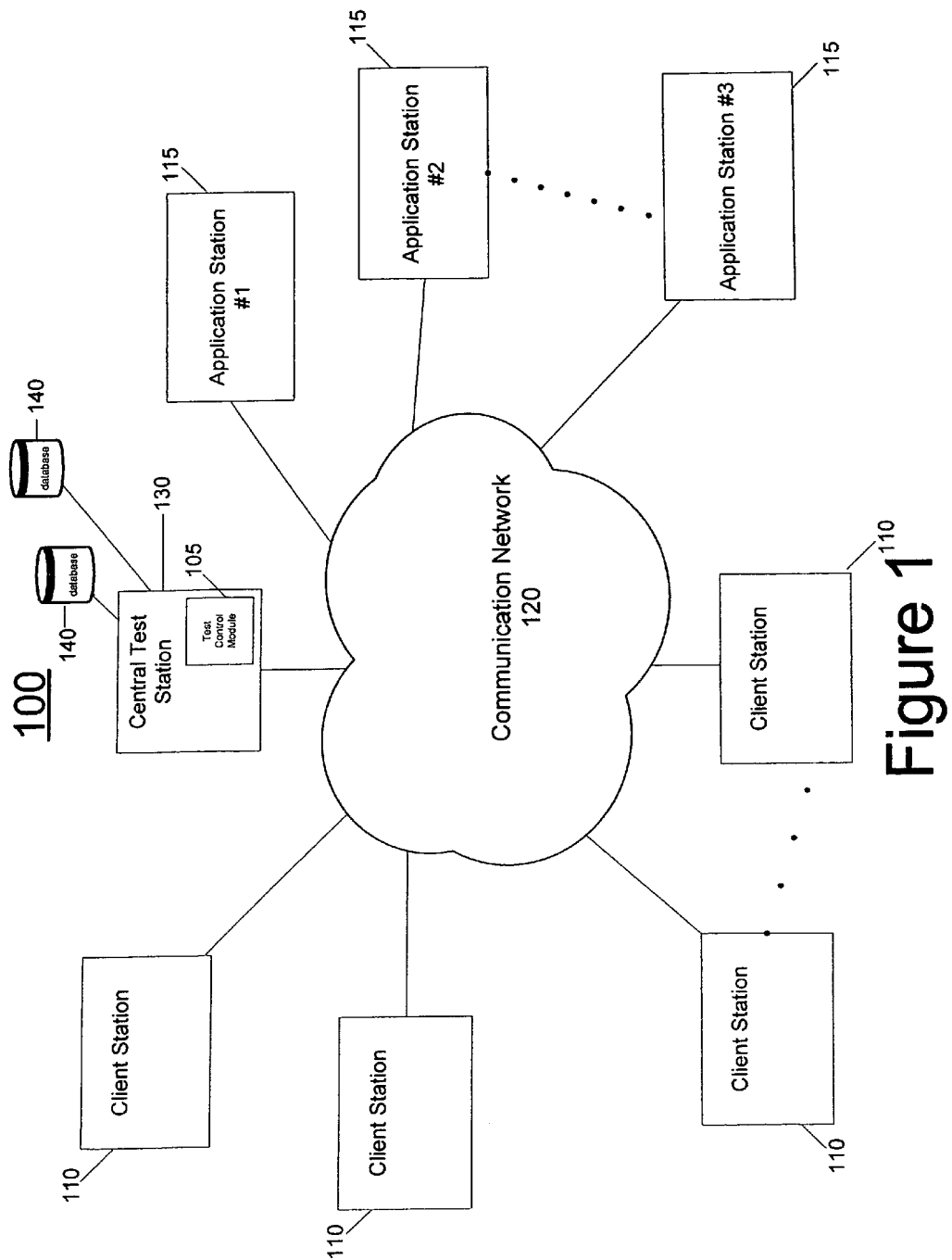
FIG. 1 is a block diagram illustrating a system for testing a web site or page, according to one embodiment of the invention.

Reference will now be made to illustrative embodiments of the invention(s) described herein, examples of which are illustrated in the accompanying drawings in which like reference characters refer to corresponding elements.

The present invention(s) are described in relation to various systems and methods for enabling users to conduct testing of applications, such as applications associated with web sites or pages, for example. Nonetheless, the characteristics and parameters pertaining to the various embodiments of the systems and methods described herein may be applicable to any type of application, such as applications related to a terminal emulator, for example. Other types of applications may be tested by the systems and methods described herein.

While the exemplary embodiments illustrated herein may show various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system, for example. Thus, it should be appreciated that the components of the various embodiments may be combined into one or more devices (or modules) or collocated on a particular node of a distributed network, such as a telecommunications network, for example. As will be appreciated from the following description, and for reasons of computational efficiency, the components of the various embodiments may be arranged at any location within a distributed network without affecting the operation of the respective system(s).

I. General Overview

According to various embodiments of the present invention, systems and methods are provided that enable a user to test various features and functionality of online application or content, such as a web site or page, for example. In some embodiments, the systems and methods described herein may enable a user to identify errors in web site or page functionality before and after the web site or page is put to actual use (e.g., uploaded to a server for commercial or public use). The systems and methods described herein may be used to test the operation of a web site to make sure that data and/or objects associated with an application work properly and produce the intended result(s). For example, a web site or page dedicated to registering users should work properly regardless of the data and information provided by the user during the registration process.

In some embodiments, the systems and methods described herein enable a user to test applications by creating and defining numerous test plans or scripts that may be resolved against the application to generate test results and statistics. A test plan or script case may comprise, for example, any number of navigation steps that define particular actions and parameters that may be resolved against objects associated with the web site, page or screen being tested. An object may comprise, for example, any portion of the web site or page that receives information form a user, provides information to a user, and/or produces or is used to produce a specific result. An object may include, but is not limited to, drop-down menus, hyperlinks, an address boxes (URL), a search boxes, icons, radio buttons, and other like screen elements that enable a user to provide or receive information, and/or that produces or is used to produce a specific result.

In some embodiments of the systems and methods described herein, each navigation step of a test plan or script may comprise at least one method and at least one object. A method, for example, may define or designate the type of action(s) to be performed on the object. For example, "WebAreaClick" may comprise an instruction (e.g., method) specifying that the particular navigation step involves initiating (e.g., clicking or activating) a particular area or part of the screen. Similarly, the instruction "WebEditSet" may comprise a method specifying that a particular box on the screen should be populated with a particular value or parameter designated in the navigation step. For example, a navigation step may specify that a particular box on the screen be populated with a user's first name. Yet another example is the instruction "WedRadioGroupSelect," which may comprise a method specifying that a particular radio button on the screen be initiated. In some embodiments, a method may comprise a particular name (e.g. WebEdit Set) that may be associated with particular code and/or data for carrying out the designated action(s). In some embodiments, the methods may be stored and maintained in a storage device and made available to a user during the test plan or script creation process. In some embodiments, methods may be defined through method maps that correlated or associate method names, for example, with corresponding code and/or data.

In some embodiments, each navigation step of a test plan or script may also include an object associated with the designated method. The object may, for example, specify the object on the screen upon which the method (e.g., action or instruction) is to be performed. For example, a navigation step comprising the method: "WebAreaClick" and the object: "http://www.abcdesf.com," would specify that the hyperlink "http://www.abcdesf.com" needs to be initiated during that step of the test process. A navigation step comprising the method: "WebEditSet" and the object: "owner.firstName_4," would specify that the box "owner.firstName_4" needs to be populated with a designated parameter or value. Yet another example may be the method "WebRadioGroupSelect" and the object "accountType_2," specifying that the radio icon "accountType_2" needs to be initiated.

In some embodiments, a navigation step of a test plan or script may also comprise parameter(s) or value(s) that may be associated with the designated objects and/or methods. A parameter may comprise a particular value to assign to the appropriate object. For example, a navigation step comprising the method: "WebEditSet," the object: "owner.firstName_4," and the parameter or value "John," would specify that the box labeled "owner.firstName_4" needs to be populated with the parameter or value "John."

In some embodiments, a test plan or script may be created by a user through a spreadsheet interface (See Table A below) that enables the user to create and define individual navigation steps by inputting the appropriate data and information regarding methods, objects, and parameters. For example, a user may define a series of navigation steps (#1-#3), each comprising an object, method, and, if necessary, a parameter that defines a particular action be performed on the application. Table A depicts an exemplary spreadsheet comprising a test plan or script for registering a user account. The first step of the process involves initiating an on screen hyperlink (www.registerme.com). The second step involves initiating a radio button for the second type account. The third and final step involves populating the first name box with the user's name, John.

TABLE A

Sample Test Plan or Script Spreadsheet

| Step | Object | Method | Parameter |
|---|---|---|---|
| 1 | www.registerme.com | WebAreaClick | |
| 2 | accountType_2 | WebRadioGroupSelect | |
| 3 | owner.firstName_4 | WebEditSet | John |

In some embodiments, the spreadsheet interface may interface or cooperate with a testing tool that carries out the test procedures (e.g., the navigation steps of the test plan or script). In some embodiments, data and information provided by the user through the spreadsheet interface may be converted to an appropriate format that is compatible with the particular testing tool(s) being used. A testing tool may comprise any system or method that reliably performs quality assurance testing of applications, such as the currently available Mercury™ QuickTest Professional™. Other test tools may of course be used.

In some embodiments, test plans or scripts may be resolved against an application to determine whether an application is working properly. In some embodiments, test plans or scripts may be converted to a format compatible with the testing tool being used to conduct the test. Once converted, the test tool will carry out the navigation steps on the application being tested. The testing tool may then record whether the particular step is performed successfully or whether it fails. Pass/fail data and information may then be converted to a format that is presentable through the spreadsheet interface. The test results may then be stored in a storage device for future use or access. Particulars of the test may also be stored, such as the date and time the test was run or stored.

The various embodiments disclosed herein comprise systems and methods that enable the testing of online applications, such as screens associated with a web site or page, for example, in a responsive and efficient manner. According to some embodiments of the invention, a software module programmed to operate according to a predetermined algorithm, for example, that may enable a user (e.g., tester) to create, revise, edit, and apply test plans or scripts including navigation steps comprising object(s), method(s), and parameter(s) or value(s) associated with a particular application. In some embodiments, the test plans or scripts may be created via a spreadsheet interface that interacts with a testing tool to test applications according to particular test plan(s) or script(s).

In some embodiments, the spreadsheet interface may interface with a storage device (e.g., database) to store and access test plan(s) or script(s). Storing the test plans or scripts enables the reuse of test data and information. Test results obtained by resolving a test plan or script against an application may also be stored and accessed as needed. For example, individual test results taken over a period of time may be stored and maintained to enable comprehensive comparative analyses. Test plan(s) or script(s) may be used, for example, to generate baseline test results that may be compared to dynamic test results as a quality assurance measure. In some embodiments, the baseline test results may comprise test results indicating that the application is operating properly and producing the intended result(s) (e.g., before the application is put to actual use). Subsequent dynamic tests of the application (e.g., after the application is up and running), may then be run using the same or modified test plan or script throughout the lifespan of the application. The dynamic test results may then be compared to the baseline results to determine the application's progress and ability to produce intended result(s). In some embodiments, baseline results may change throughout the life of an application as content evolves or changes.

II. Exemplary System Components

FIG. 1 illustrates a system 100 for testing applications such as online content, for example, according to one embodiment of the invention. System 100 may comprise a test control module 105 which may operate on a central control station 130 accessible to client station 110. Client station 110 may connect to or communicate with any number of other stations (e.g., client stations 110, central test station 130, and/or application stations 115) through any number of communication networks, such as communication networks 120, for example. In some embodiments, test control module 105 may be installed as part of a user's client station 110 to enable a user to perform the various testing features and functionality described herein.

According to various embodiments, test control module 105 may host one or various modules that operate to perform the various steps and functions of the claimed invention, such as the creation and editing of test plans or scripts, the creation and editing of object and method maps, the initiation of tests, the reporting of test results and comparisons, and other related features and functionality. In some embodiments, such module(s) may be hosted by test client station 110, in which case testing may be conducted locally, while in other embodiments, the module(s) may operate over a network so that testing may be done remotely.

According to various embodiments, client station 110 may comprise a typical home or personal computer system whereby a user may interact with a network, such as the Internet, for example. Client station 110 may comprise or include, for instance, a personal or laptop computer. Client station 110 may include a microprocessor, a microcontroller or other general or special purpose device operating under programmed control. Client station 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client station 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client station 110 may also include a network-enabled appliance, a browser-equipped or other network-enabled cellular telephone, or another TCP/IP client or other device.

Application stations 115 may comprise any station or module hosting an application(s) to be tested by the systems and methods described herein. An application may comprise online content associated with a web site or page, for example, that is to be tested by a user of client station 110 and test control module 105. In some embodiments, application stations 115 may comprise or host a web site or page that contains various objects requiring or enabling user input or interaction. For example, a web site may include a box that enables a user to enter keyword(s) to conduct searches or provide information. An application may also include icons, menus, radio buttons, hyperlinks, and other like screen elements that enable a user to provide or receive data or information related to the application.

Central test station 130 may enable administration of the test control module 105 on the user's computers. Central test station 130 may comprise a single server or engine. In some embodiments, central test station 130 may comprise a plurality of servers or engines, dedicated or otherwise, which may further host modules for performing desired system features and functionality. Central test station 130 may, for example, host or download to client stations 110 one or more applications or modules that function to permit interaction between test control module 105, client stations 110 and application station 115 as it relates to the systems and methods described herein, for example. Central test station 130 may download to client stations 110 modules that enable test control module 105 to receive information or data for storage in database 140, for example. The features of functionality described herein may be performed by central test station 130 via a single module or set of modules.

Data and information maintained by central test station 130 may be stored and cataloged in database 140 which may be or interface with a searchable database. Database 140 may comprise, include or interface to a relational database. Other databases, such as a query format database, a Standard Query Language (SQL) format database, a storage area network (SAN), or another similar data storage device, query format, platform or resource may be used. Database 140 may comprise a single database or a collection of databases, dedicated or otherwise. In one embodiment, database 140 may store or cooperate with other databases to store data and information used by the various systems and methods described herein.

Communications network 120 may comprise any type of communication network such as one able to transmit and receive data or information relating to test plan or scripts used by the systems and methods described herein, for example. Communications network 120 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (HMI) connection, or a Copper Distributed Data Interface (CDDI) connection. Communications network 120 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 120 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 120 may comprise a satellite communications network, such as a direct broadcast communication system (DBS) having the requisite number of dishes, satellites and transmitter/receiver boxes, for example. Communications network 120 may also comprise a telephone communications network, such as the Public Switched Telephone Network (PSTN). In another embodiment, communication network 120 may comprise a Personal Branch Exchange (PBX), which may further connect to the PSTN.

Figure 2:
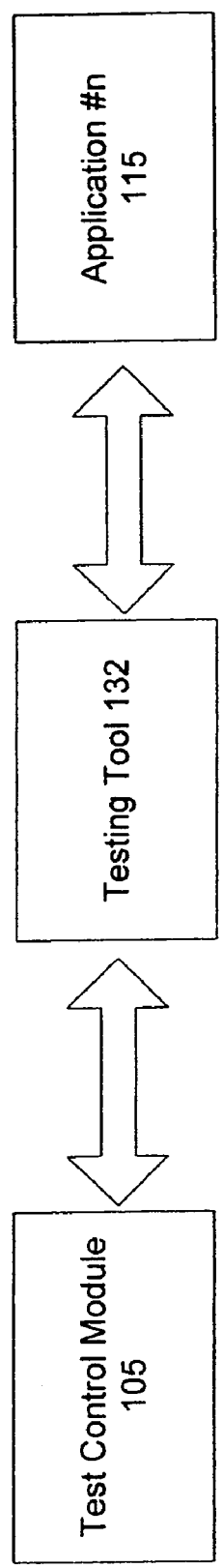
FIG. 2 is a diagram illustrating data and information flow through various components of the systems and methods described herein, according to one embodiment of the invention.

FIG. 2 depicts a general flow path of data and information used to test applications and create test plans or scripts, according to one embodiment of the invention. As shown, data and information relating to the testing of applications and creation of test plans or scripts may be exchanged between test control module 105, testing tool 132, and application #n 115. In some embodiments, test control module 105 may provide an interface to testing tool 132 that enable a user/tester to efficiently create, edit and revise test plans or scripts, conduct or initiate tests of applications, and view reports of test results and comparisons of test results. Testing tool 132 may comprise any standard tool, product, device, or application that interfaces with an application. In some embodiments, test control module 105 provide a user-friendly interface to testing tool 132 to enable the tester to readily interact with testing tool 132. In some embodiments, data and information processed by test control module 105 may be in a different format than information processed by testing tool 132. In such a situation, conversion between the two formats may be necessary to ensure a seamless exchange of data and information. For example, data maps may be generated and maintained that relate or associate data and information between various formats.

Data and information flowing rightward in the figure may proceed as follows. A tester may interact with test control module 105 to create a test plan or script for a particular application #n. In so doing, the tester may create navigation steps that correlate objects, methods, and/or parameters or values that specify a particular action to be taken in the application. In some embodiments, the objects, methods and/or parameters or values are stored in a storage device where they may accessed by the user and arranged in as required by a particular test or application. A tester may store newly created test plans or scripts in the storage device, or may access existing ones and revise or edit them as necessary.

Once a test plan or script is defined, it may be transmitted to testing tool 132 for actual performance of the test. In some embodiments, the test plan or script may need to be converted to a format compatible with the particular testing tool 132 being used. Such conversion maybe performed, for example, by maps that correlate or associate data or information in a first format with data or information in a second format. For example, data or information processed by test control module 105 may be in the first format, while data or information processed by the testing tool 132 may be in the second format. Once testing tool 132 receives the test plan or script in an appropriate format, it may proceed to carry out the steps of the test in the order provided.

Data and information may also proceed leftward in the figure. In some embodiments, for example, testing tool 132 may monitor the application during the testing process and generate and present results associated therewith. For example, particular steps of the test plan or script may be resolved successfully or may fail. Pass/Fail and other test results may be stored and maintained, and may be provided to the user for review and analysis. Other test statistics and relevant data and information may also be reported and maintained.

Figure 2A:
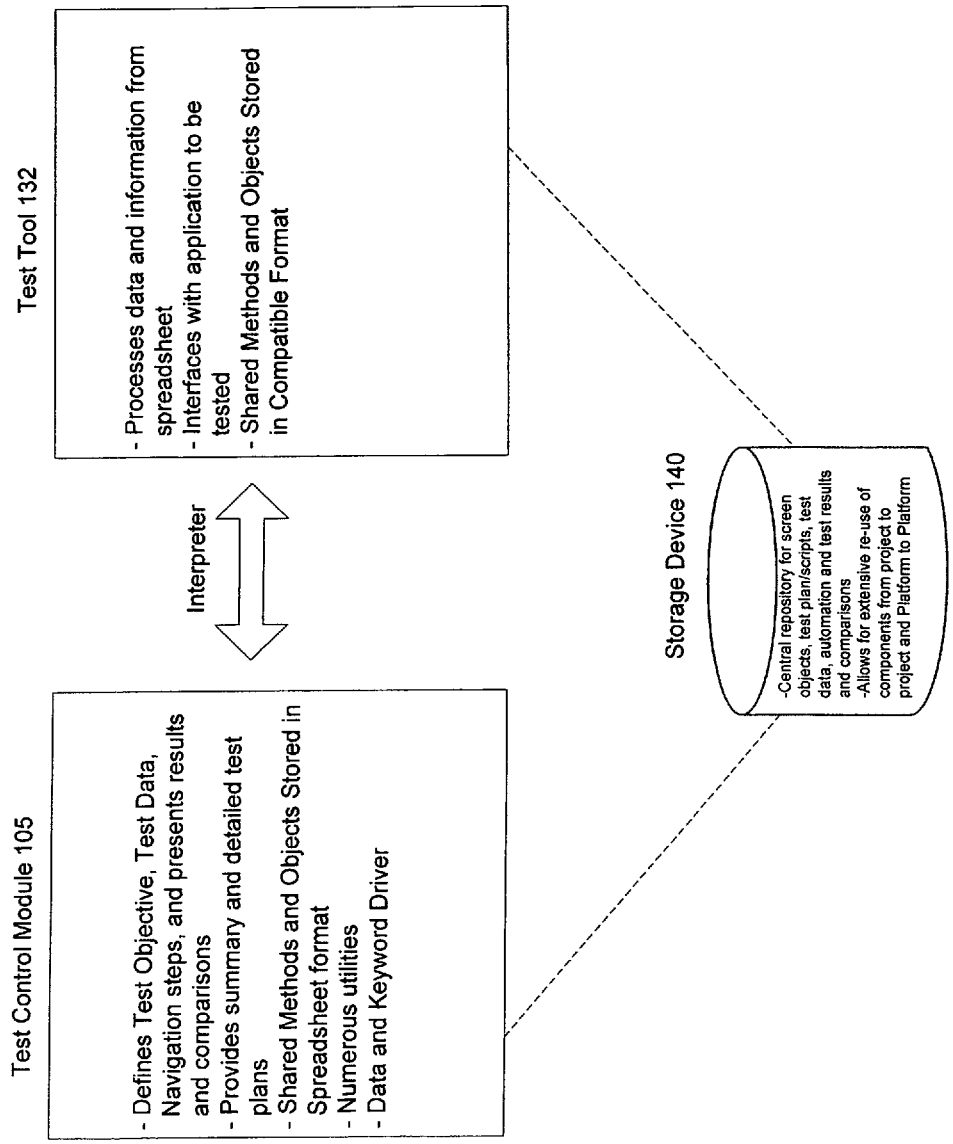
FIG. 2*a* is a diagram illustrating data and information flow through various components of the systems and method described herein, according to one embodiment of the invention.

FIG. 2a depicts a general flow path of data and information used to test applications and create test plans or scripts, according to one embodiment of the invention. As shown, tests may be conducted with a test control module 105, testing tool 132, and a storage device 140. Test control module 105 may include a spreadsheet document or interface (not shown) that may comprise the graphical user interface by which a tester communicates with test control module 105 and testing tool 132. In some embodiments, test control module 105 may enable a user, through the spreadsheet document or interface, for example, to define test objectives and methods, test data, navigation steps, and other related values or parameters. Test control module 105 may also, through the spreadsheet document or interface, provide summary and detailed test plans, and present test results and comparisons to a user. In some embodiments, test control module 105 may provide numerous utility functions that facilitate the test creation and administration process, e.g. See FIG. 19.

Testing tool 132 may process data and information from test control module 105. In some embodiments, data and information from test control module 105 may be converted to a format compatible with testing tool 132. Testing tool 132 may interface directly with the application being tested, and may maintain the appropriate methods and objects for carrying out the navigation steps of a testing plan or script. In some embodiments, testing tool 132 may comprise any system, product, device, module, or application, for example, that is able to conduct testing of applications according to particular test plans or scripts. An exemplary implementation of testing tool 132 may comprise components of Mercury™ QuickTest Professional™.

Storage device 140 may comprise a central repository for screen objects, methods, test plans or scripts, test data, and test results and comparisons, such as a file system or database, for example. In some embodiments, data and information maintained by storage device 140 may be accessed by test control module 105 and testing tool 132 to carry out the various features and functionality described herein. For example, storage device 140 may store test plans or scripts created by a user using the various test plan or script creation methods described herein. Testing tool 132 may also interface with storage device 140 to access methods and objects compatible with the various testing tools used to test applications.

Figure 3:
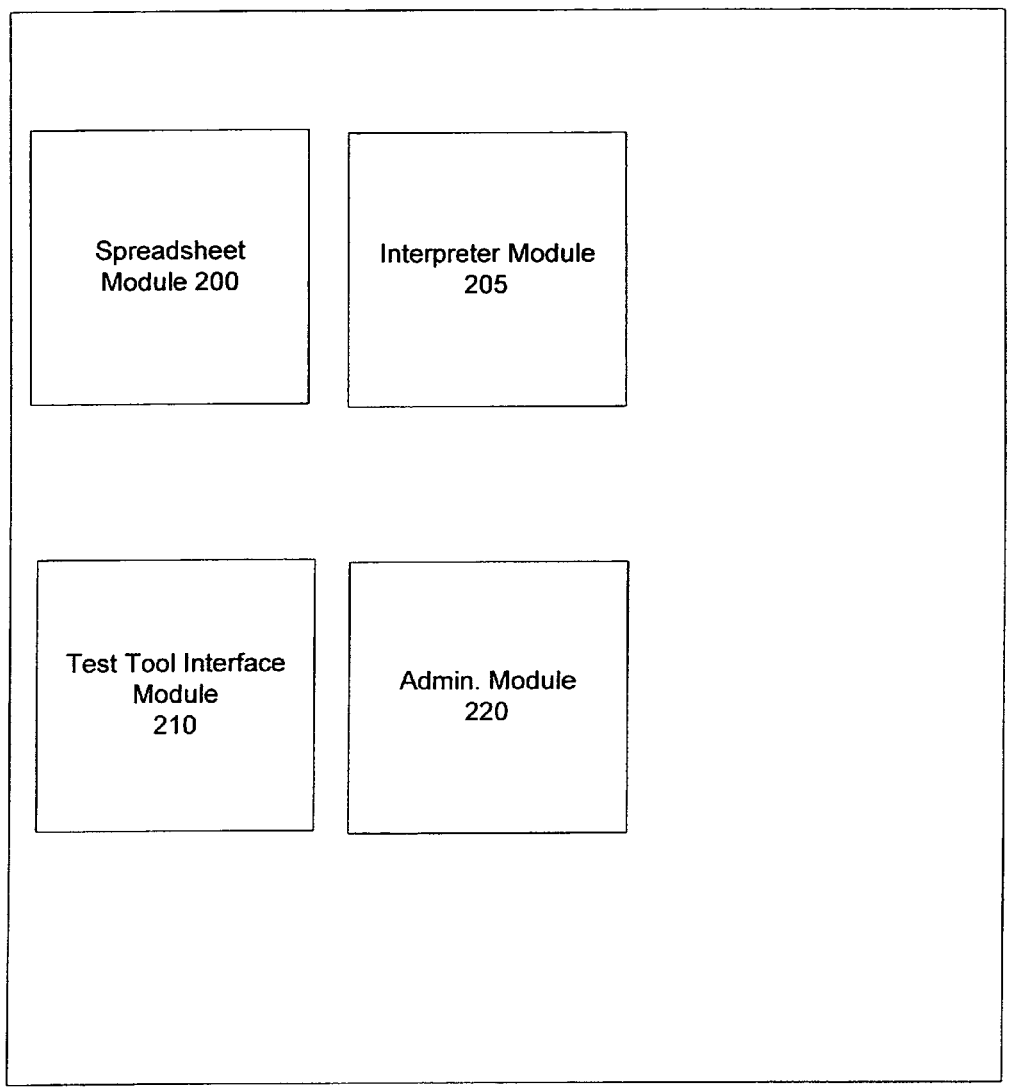
FIG. 3 is a block diagram illustrating exemplary modules associated with a test control tool module, according to one embodiment of the invention.

FIG. 3 illustrates exemplary modules that may be associated with test control module 105 for carrying out (or administering) the various functions and features of the embodiments described herein. In some embodiments, the modules may: (1) be accessed by an agent of central test station 130, (2) be accessed by a user of client station 110, and/or (3) coordinate with central test station 130 and/or client station 110 the testing of application stations 115 according to test plans or scripts created using. While the modules may not be used in all embodiments to perform some or all of the functions of the present invention, they are nonetheless presented as possible embodiments:

Spreadsheet module 200 may, in some embodiments, operate to provide a user or tester interacting with client station 110, for example, with at least one interface to carry out the various features and functions described herein, such as interacting with testing tool 132 to coordinate the testing of applications. In some embodiments, spreadsheet module 200 may present various spreadsheet interfaces that enable the tester to efficiently create, edit, or revise test plans or scripts that specify testing procedures to be employed by testing tool 132. Such interfaces may enable a tester to efficiently create and define navigation steps by associating appropriate methods, objects and parameters or values. In some embodiments, the interfaces may enable a tester to access stored test plans or scripts, methods or objects to facilitate the retesting of applications, or to enable the user to revise, edit or modify such test plans or scripts, methods or objects. Interfaces may also be used to present individual and comparative test results and statistics to a tester. Exemplary interfaces are set forth in Table A above and in FIGS. 11-19 described below.

Interpreter module 205 may, in some embodiments, operate to convert data and information processed by spreadsheet interfaces of spreadsheet module 200, for example, to appropriate formats compatible with testing tool 132. In some embodiments, interpreter module 205 may coordinate tables or maps that associate or correlate methods with appropriate code and/or data.

Test tool interface module 210 may, in some embodiments, cooperate with interpreter module 205 to ensure proper communication between testing tool 132 and spreadsheet module 200 in connection with the features and functions described herein. In some embodiments, for example, test tool interface module 210 may identify the type of testing tool 132 being used to enable proper format conversion by interpreter module 205. For example, a first test tool might require data and information in a first format, while a second test tool might require a second format. Test tool interface module 210 may determine other particulars about the testing tool 132 that help facilitate the processing of the various features and functions described herein.

Administration module 220 may, in some embodiments, enable an agent of central test station 130, for example, to input information related to test plans or scripts, including but not limited to objects, methods, and/or parameters or values. According to various embodiments, an agent of central test station 130 may interface with a graphical user interface (or GUI) to input or receive: (1) data and information relating to spreadsheet formats in which users (e.g. testers) are to create, edit or revise test plans or scripts, navigation steps, objects, methods, and/or parameters or values, (2) data and information regarding formats compatible with various testing tools which will interface with the various spreadsheet modules described herein, such as code and/or data used by testing tool 132 to carry out or perform the testing and/or test plan or script creation systems and methods described herein, (3) data and information regarding formats used to present test results and statistics to a user/tester, and (4) data and information involving or comprising rules with which to assess test results and statistics. Other data and information may be provided or received. An agent of command control station 130 may also input information relating to information or data regarding the test plans or scripts, navigation steps, objects, methods, parameters or values that may be stored in a database 140, for example.

Figure 4:
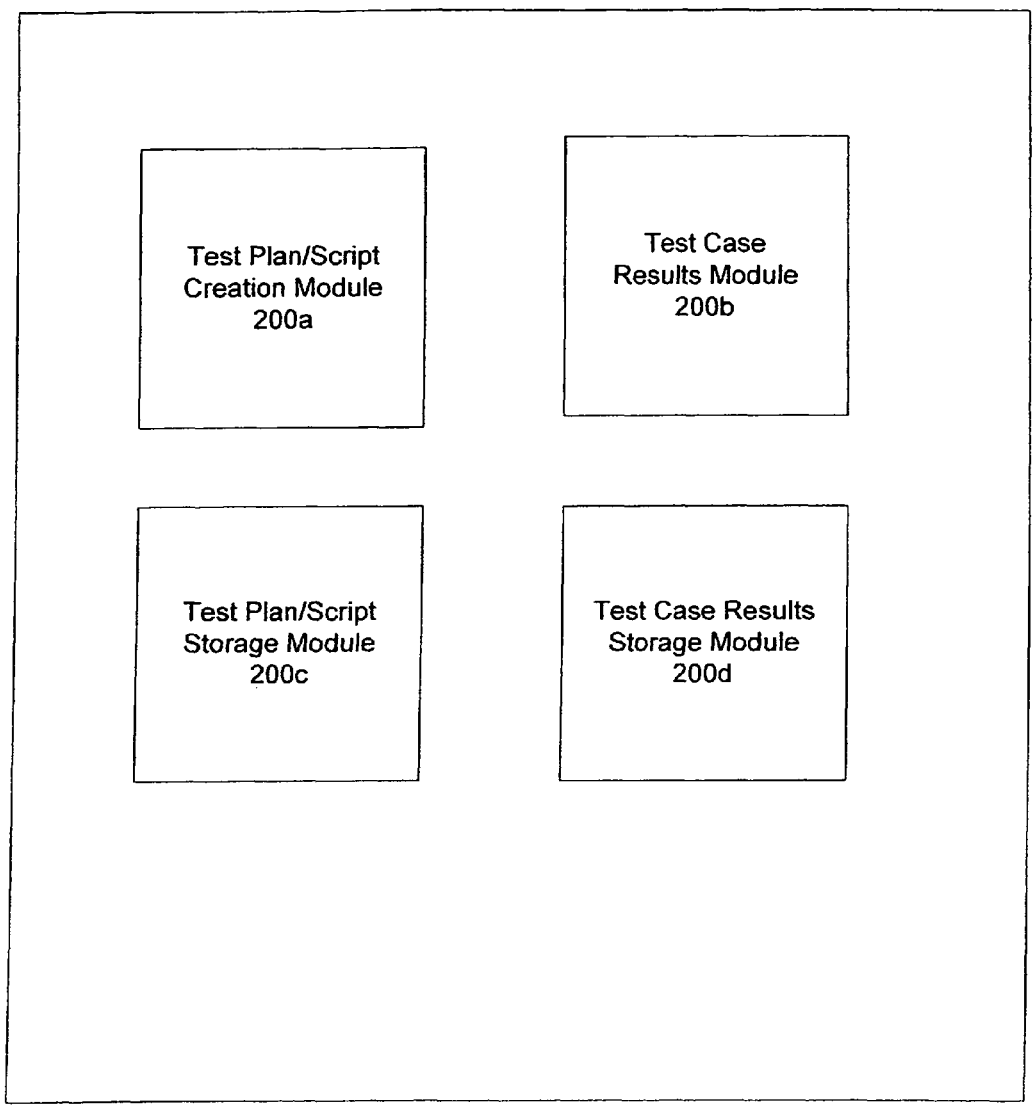
FIG. 4 is a block diagram illustrating exemplary modules associated with a spreadsheet module, according to one embodiment of the invention.
Figure 4A:
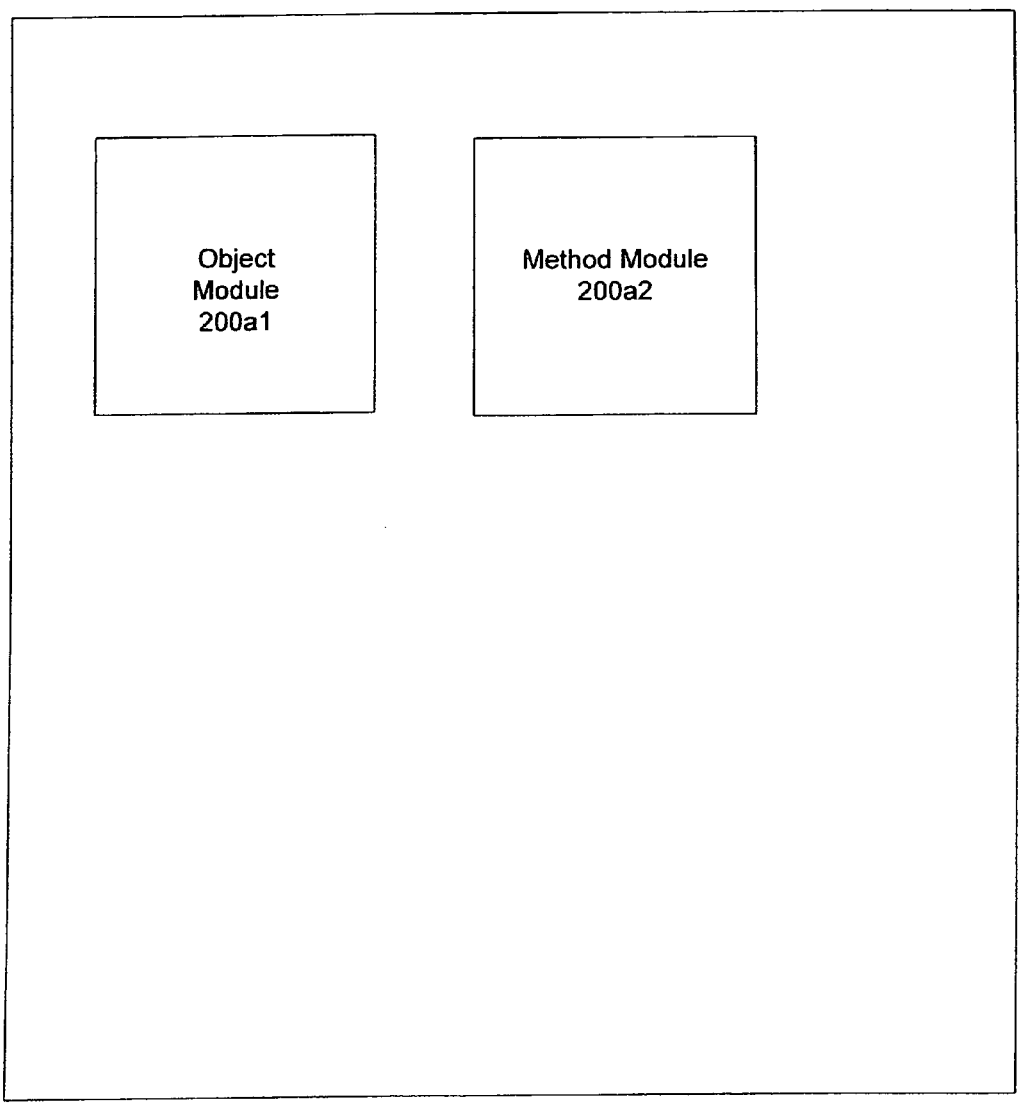
FIG. 4*a* is a block diagram illustrating exemplary modules associated with a test plan or script creation module, according to one embodiment of the invention.
Figure 4B:
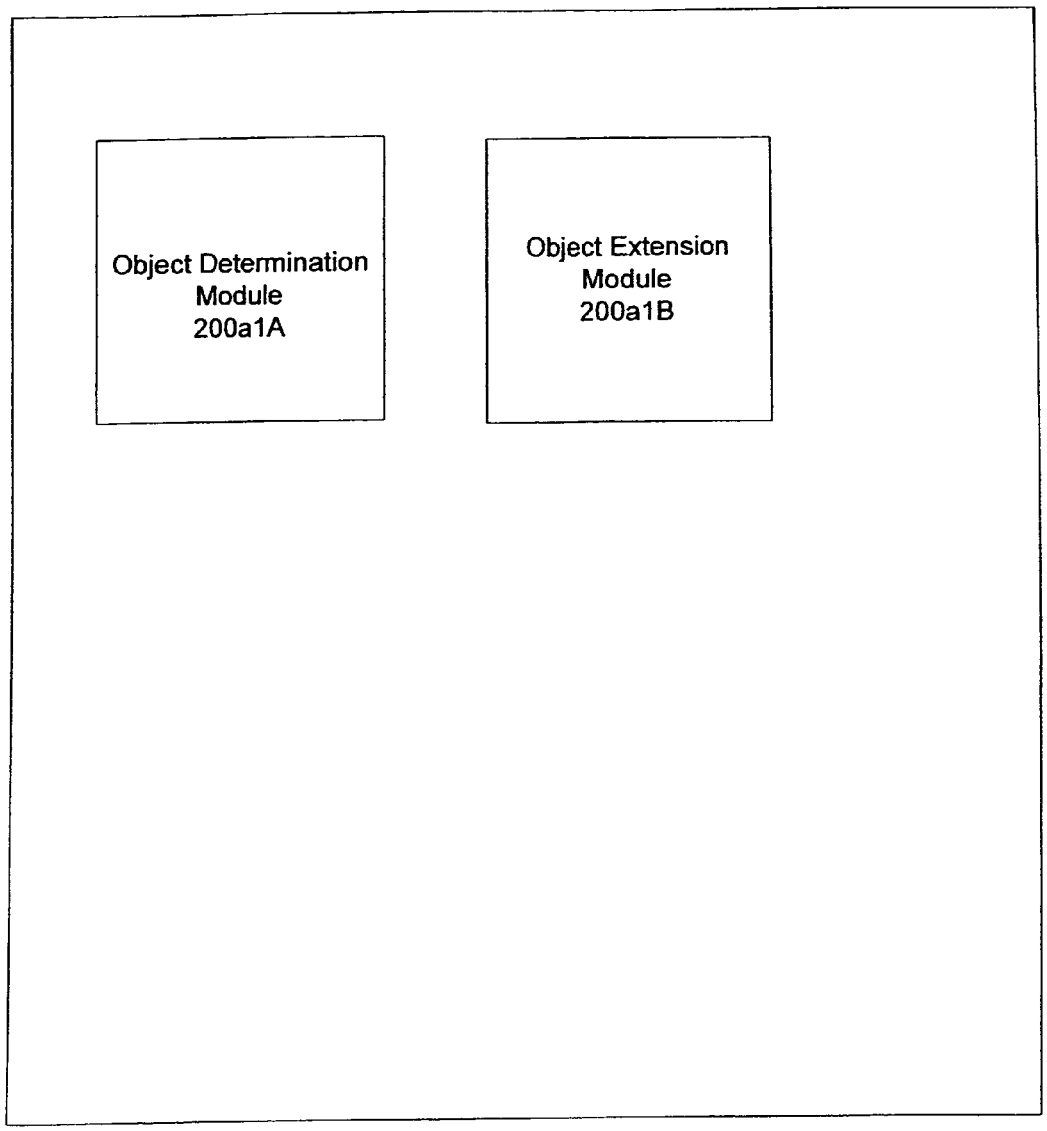
FIG. 4*b* is a block diagram illustrating exemplary modules associated with an object module, according to one embodiment of the invention.
Figure 4C:
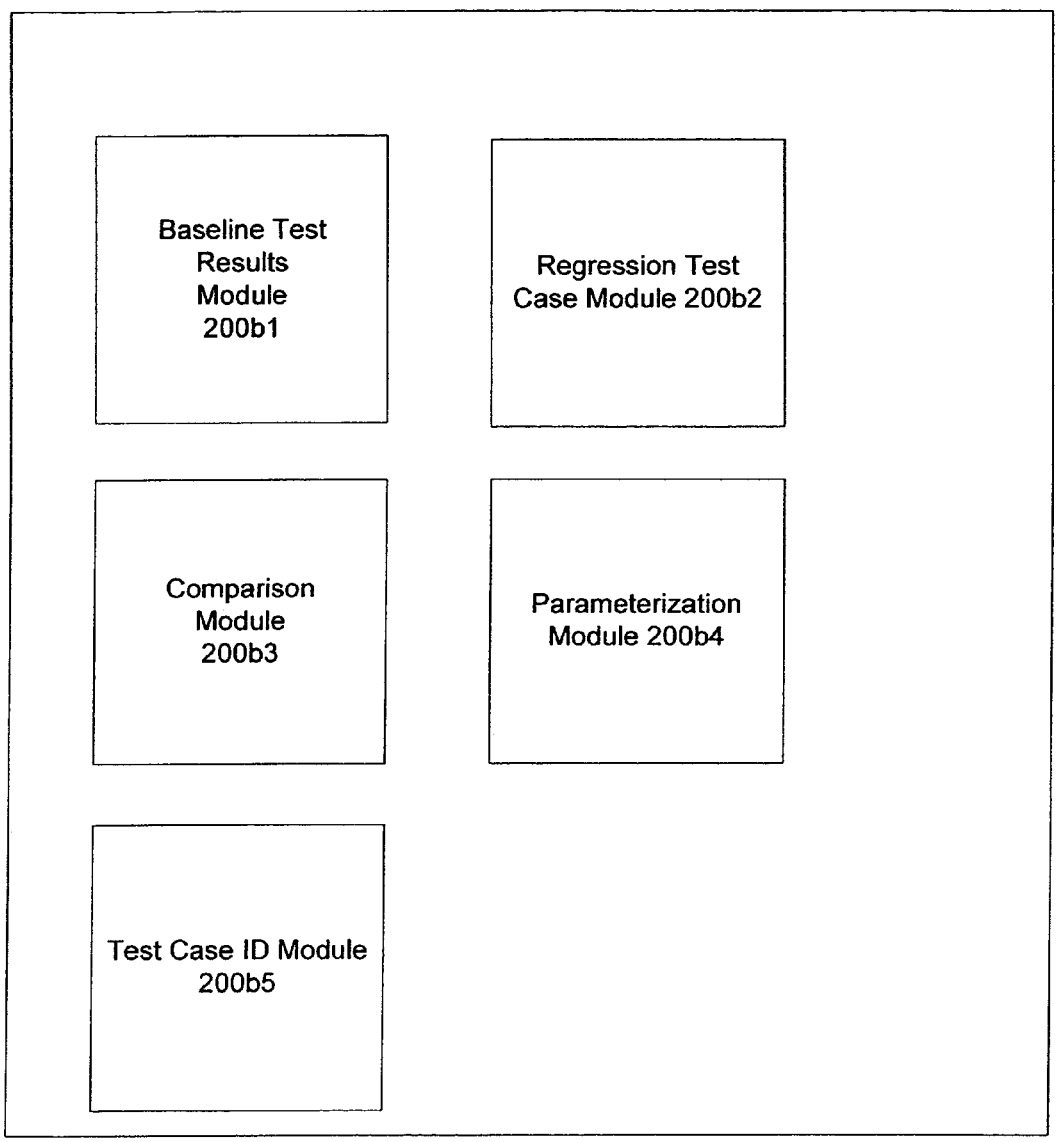
FIG. 4*c* is a block diagram illustrating exemplary modules associated with a test results module, according to one embodiment of the invention.

FIGS. 4-4c illustrate exemplary modules that may cooperate with spreadsheet module 105, interpreter module 205, test tool interface module 210, and/or administration module 220 to carry out the various features and functions described herein. Each is described below.

FIG. 4 illustrates a test plan or script creation module 200a that may, in some embodiments, enable a user to create test plans or scripts setting forth particular navigation steps to be performed during a test of an application. In some embodiments, test plan or script creation module 200a may cooperate with spreadsheet module 200 to enable a tester to create test plans or scripts via a spreadsheet interface. In such an embodiment, the user may define test plan or script steps to be carried out during the testing of an application. Test plan or script creation module 200a may also interface with various storage device(s) (e.g. a file system or database 140) to coordinate storage and access to test plans or scripts created by a tester, for example.

In some embodiments, test plan or creation module 200a may cooperate with an object module 200a1, shown in FIG. 4a, that operates to coordinate processing of object data and information. In some embodiments, for example, object module 200a1 may enable a user/tester to create, edit, revise, store and access object maps that define or associate object names recognized by spreadsheet module 200 with corresponding code and/or data that enables the designated object to be recognized by testing tool 132, for example. In some embodiments, the code and/or data that enables the testing tool 132 to recognize an object on the screen may comprise any mark up language, such as hyper text mark up language (HTML), for example. Object maps may also be used by interpreter module 205 to convert spreadsheet data and information to a format compatible with testing tool 132. Exemplary object maps are shown below in Table B and FIG. 17.

TABLE B

Sample Object Map

| Object | Recognition Method |
|---|---|
| www.registerme.com | Code #1 |
| owner.firstName_4 | Code #2 |
| accountType_2 | Code #3 |

As shown in Table B, when a testing tool 132 is carrying out the navigation steps of a test plan or script that contains the object, www.registerme.com, for example, testing tool 132 will look for a screen object that matches that set forth by code #1. Objects owner.firstName_4 and accountTye_2 would be designated by Code #2 and #3, respectively. In some embodiments, a tester may edit or revise the names of objects associated with particular codes, and vice-versa.

In some embodiments, object module 200a1 may comprise or cooperate with an object determination module 200a1A, shown in FIG. 4b, that enables a tester to dynamically define objects associated with a particular screen. For example, the systems and methods described herein may identify. In some embodiments, objects may be identified by requesting that the user navigate all screens of an application to enable object determination module 200a1A to scan the screen/application and extract object codes found therein. In some embodiments, extracted object codes may be formatted in at least one object map that the tester may then access to associate particular object names with the extracted codes.

In some embodiments, object module 200a1 may comprise or cooperate with an object parameter determination module 200a1B, shown in FIG. 4b, that enables a tester to dynamically define or identify parameters or values associated with particular on screen objects. For example, if object determination module 200a1A identifies an object comprising a drop-down menu on the screen for a user to select his state of residence, object parameter determination module 200a1B may identify all parameters or values associated with that drop-down menu, e.g., all 50 states. In some embodiments, parameters or values associated with an object may be mapped in the corresponding object map(s).

TABLE C

Sample Extended Object Map

| Object | Recognition Method | Parameters |
|---|---|---|
| www.registerme.com | Code #1 | N/A |
| prefixName_1 | Code #2 | Mr., Ms. Mrs, Dr. |
| dropdown_state_1 | Code #3 | All 50 states |

In some embodiments, test plan or creation module 200a may cooperate with a method module 200a2, shown in FIG. 4a, that operates to coordinate processing of method data and information. In some embodiments, for example, method module 200a2 may enable a user/tester to create, edit, revise, store and access method maps that define or associate method names recognized by spreadsheet module 200 with corresponding code and/or data compatible with testing tool 132, for example. In some embodiments, the code and/or data enables or instructs the testing tool 132 to perform the action(s) designated. Method maps may also be used by interpreter module 205 to convert spreadsheet data and information to a format compatible with testing tool 132.

In some embodiments, test plan or script creation module 200a may cooperate with a test plan or script storage module 200c to store or access test plan or scripts (including object and method maps) created, edited, updated or revised by a user. Such test plan or scripts may be maintained in a storage device, such as a file system or database 140, for example.

Referring back to FIG. 4, test results module 200b may, in some embodiments, enable a user to generate test results or statistics based on a test of an application. In some embodiments, test results module 200b may cooperate with spreadsheet module 200 to enable a tester to view such test results or statistics test plans or scripts via a spreadsheet interface. Test results module 200b may also interface with various storage device (e.g. database 140 or a file system) to coordinate storage and access to previous test results or statistics, for example.

In some embodiments, test results module 200b may cooperate with a baseline test results module 200b1, shown in FIG. 4c, that operates to coordinate the generation, processing, storage and accessing of baseline test results. In some embodiments, baseline test results may comprise test results and statistics that correspond to a fully or properly functional application. Baseline test results may be determined, for example, before an application is launched, or at any other time when associated objects are determined to be performing properly. In some embodiments, baseline test results may be associated with a particular test plan or script, and/or with an application.

In some embodiments, test results module 200b may also cooperate with a regression test results module 200b2, shown in FIG. 4c, that operates to coordinate the processing of regression test results. In some embodiments, dynamic test results may comprise test results and statistics that in response to tests conducted by resolving test plan(s) or script(s) against designated application(s). Regression test results may be determined, for example, any time a tester would like to test the functionality of an application. In some embodiments, dynamic test results may be associated with a particular test plan or script, and/or with an application.

In some embodiments, test results module 200b may cooperate with a comparison module 200b3, shown in FIG. 4c, that operates to coordinate comparisons between baseline and subsequent regression test results, for example. Such comparisons may track an application's evolution by pointing out or highlighting changes in data (e.g., text) and/or the operation of objects, for example, during particular points in time. Baseline and regression results may comprise the logging of steps performed with test cases included. A test case may comprise, for example, the capturing the text of a .pdf document (e.g., WebCaptureText). During the baseline or regression run of the test, the .pdf test case is executed and the text is captured. During comparison, the test case in the regression may be compared line-by-line to the baseline. If the text is identical, the test case will pass. If text has changed, the test case will fail.

For example, assume a particular web page that presents textual content is tested. Baseline results may be generated by scanning the web page and recording all textual presentations and objects associated with the test page. The baseline results, including test cases, may be captured, assigned a particular test case identifier, and stored for future use. Then, some time later, regression results may be generated by the scanning the web page and recording all textual presentations and objects associated with the test page. The regression results, including test cases, may be captured, assigned a particular test case identifier, and stored for future use. The comparison module may then compare the regressions results with the baseline results and determine whether any has failed. In some embodiments, the newly developed regression results may be designated the new baseline, such as when changes to a web page or site are permanent.

In some embodiments, test results module 200b may cooperate with a parameterization module 200b4, shown in FIG. 4c, that operates to enable a user to parameterize particular dynamic data or objects. For example, assume a particular pdf document on a web page or site will includes text that changes daily, such as a quoted interest rate in a bank web site or page or a date field, for example. The parameterization module may enable a user to parameterize the dynamic text (i.e., interest rate) so that the comparison module, for example, knows not to register a failure if the rate, as expected, changes from the original baseline result. Thus, if there is dynamic information in the test case, the testing tool may ignore the text if defined as dynamic by the tester.

In some embodiments, test results module 200b may cooperate with a test case ID module 200b5, shown in FIG. 4c, that dynamically names test cases. In some embodiments, test case names may be dynamically generated to make it easier for the tester to write and execute test plans. For example, each time a test function is called (e.g., WebCaptureText), a test case ID (e.g., WebCaptureText1 . . . 9999) may be generated and assigned to the test plan test case. A test case ID may comprise any digit(s), character(s), symbol(s) or combinations thereof, that identify a particular test case(s).

In some embodiments, test results module 200 may cooperate with a test results storage module 200d to store or access test plan or scripts (including object and method maps), baseline or regressions results and test cases that are run, created, edited, updated or revised by a user. Such test plan or scripts, results and test cases may be maintained in a storage device, such as a file system or database 140, for example. In some embodiments, results and test cases may be stored and accessed by test case ID.

FIG. 5 illustrates an exemplary screen 500 representing an account registration page containing data and objects that may be tested according to the systems and methods described herein. As shown, screen 500 may comprise at least eight (8) objects: (1) account type radio buttons, (2) first name box, (3) last name box, (4) home address box, (5) city box, (6) state drop-down menu, (7) "click here to use stored address" hyperlink, and (8) "Send" icon. In some embodiments, test plans or scripts may be created in spreadsheet format to include navigation steps that define actions to be resolved against each of the above objects. For example, a step may request that an individual account be selected. The test plan or script may also request that the following information be populated in the first name, last name, homes address, and city boxes:

First Name: John
Last Name: Doe
Home Address: 1 Main Street
City: Anywhere

The test plan or script may also request that drop-down menu be initiated to select New York, while the hyperlink object is not to be initiated since an address has already been provided. In some embodiments, however, the test plan or script may initiate the hyperlink should it prefer to use a stored address.

In some embodiments, baseline and regressions tests may be conducted to make sure that the form data is filled correctly with data (e.g., WebCaptureText). Baseline and regression results may be obtained using the above test plan or script, as shown in Table D below. As shown, baseline results indicate an individual names John Doe at a particular address. However, the regression results indicate an individual named Jane Smith at a different address. Accordingly, a comparison between the two with indicate failures at steps 2-6.

TABLE D

Sample Results Spreadsheet

| Step | Baseline | Test #1 | Comparison |
|------|----------|---------|------------|
| 1 | Individual | Individual | Pass |
| 2 | John | Jane | Fail |
| 3 | Doe | Smith | Fail |
| 4 | 1 Main Street | 2 Main Street | Fail |
| 5 | Anywhere | Somewhere | Fail |
| 6 | NY | VA | Fail |

Screen 500 may also be used to demonstrate the features and functionality related to object determination and identification. A tester wanting to create a test plan or script for testing screen 500, for example, may need to identify the objects associated therewith. In one embodiment, the tester may interact with test control module 105 to initiate the object determination functionality of object module 200a1 or object determination module 200a1A. In some embodiments, object module 200a1 may request that the test navigate screen 500 so that the objects may be automatically identified by object determination module 200a1A, for example. In some embodiments, objects may be identified manually by the tester. In some embodiments, parameters or values associated with the identified objects may also be determined as described above. The identified objects and associated parameters or values may then populate an object map as set forth above.

III. Exemplary Methods

Exemplary methods that may be performed by the various systems described above will now be discussed.

Figure 6:
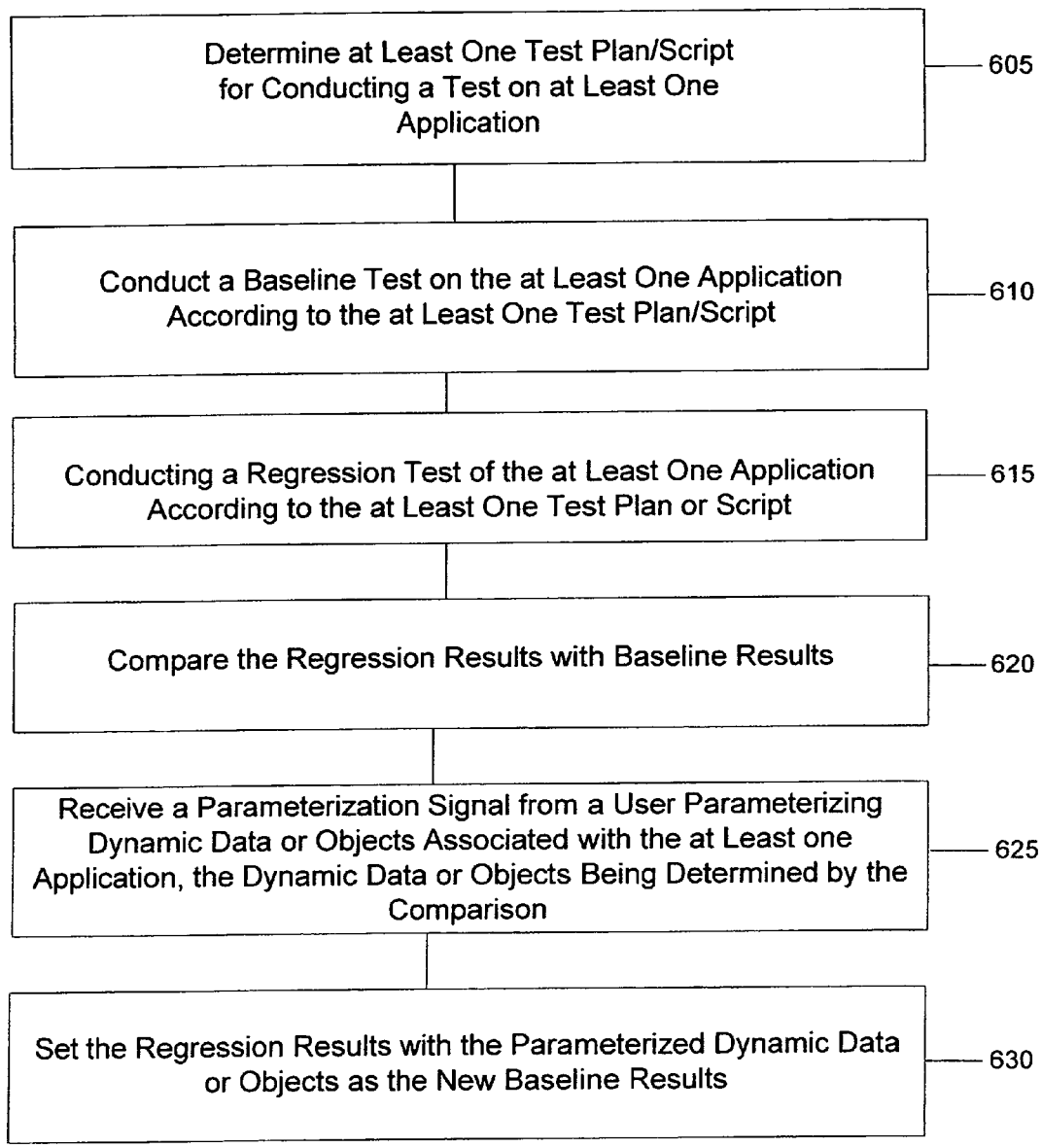
FIG. 6 illustrates a method 600 for testing an application, according to one embodiment of the invention.

FIG. 6 illustrates one embodiment of a method 600 for testing an application. At step 605, the various systems described herein may determine at least one test plan or script for conducting a test on at least one application. For example, test control module 105 may receive a signal from a user of client station 110 to initiate a test of an application 115 using a particular test plan or script. In some embodiments, test control module 105 may also determine that the user wants to use a particular test plan or script that the user may have created. At step 610, test control module 105 may conduct a baseline test of the application using a particular test plan or script. In some embodiments, testing tool 132 performs the navigation under the control of the test control module 105 and more particularly the test plan or script as set forth in a spreadsheet document or interface. In some embodiments, before the navigation steps are performed, the data and information comprising the navigation data steps may need to be converted to a format compatible with the particular testing tool being used to conduct the test. In some embodiments, the baseline results and related test cases may be assigned a particular test case ID and stored for future use.

At step 615, test control module 105 may conduct a regression test of the application using a particular test plan or script. In some embodiments, testing tool 132 performs the navigation under the control of the test control module 105 and more particularly the test plan or script as set forth in a spreadsheet document or interface. The regression results and related test cases may be assigned a particular test case ID and stored for future use.

At step 620, the results of the baseline and regression tests may be compared to determine discrepancies. In some embodiments, each step or line of a test plan or script may be compared to ensure that similar results are obtained. If the results match, then a "pass" is recorded and displayed to the user. If the results differ, then a fail is recorded and displayed. Pass/fail statistics (e.g., number of passes and fails) may be presented to the user via spreadsheet document or interface.

At step 625, a parameterization signal may be received from a user that parameterizes dynamic data or objects associated with the application. Thus, if particular data or objects are expected to change or evolve, a user may specify that such data or objects are to be ignored during subsequent comparison. In some embodiments, the user may mark-up the spreadsheet document or interface to indicate which data or objects are to be ignored, such as by providing a character, symbol, digit, or any combination thereof alongside the data or objects to be ignored. In some embodiments, select portions of data or objects may be parameterized. Also, in some embodiments, the parameterization signal may be automatically generated and applied by an appropriate software, module or algorithm. For example, such software, module or algorithm may identify which data or object(s) to parameterize and may perform the appropriate steps to parameterize such data or object(s).

At step 630, a new baseline signal may be received from a user to set the regression results as the new baseline. For example, the changes that have occurred may be permanent and should thus be considered as a baseline measure in future tests. In some embodiments, therefore, a user may make such a designation, such as by initiating an appropriate icon on the spreadsheet document or interface, for example.

Figure 6A:
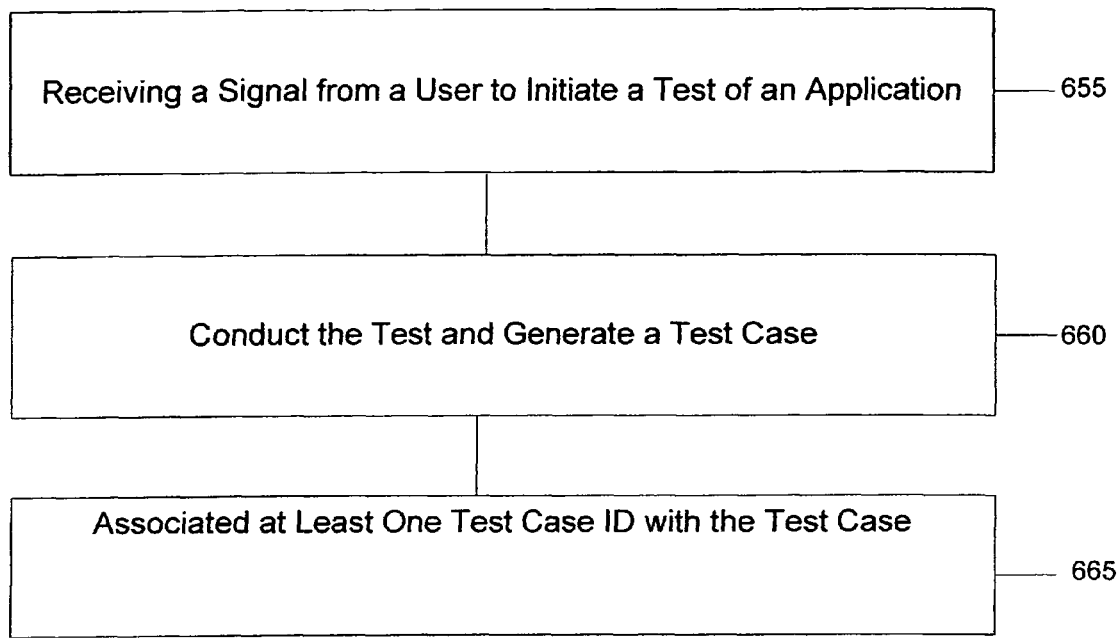
FIG. 6*a* illustrates a method 650 for associating a test case ID with a test case, according to one embodiment of the invention.

FIG. 6a illustrates one embodiment of a method 650 for associating a test case ID with test results or test cases. At step 655, a signal is received from a user to initiate a test of an application. At step 660, the test is conducted by the systems and methods described herein. At step 665, the test case ID is associated with the test result(s) or test case(s).

Figure 7:
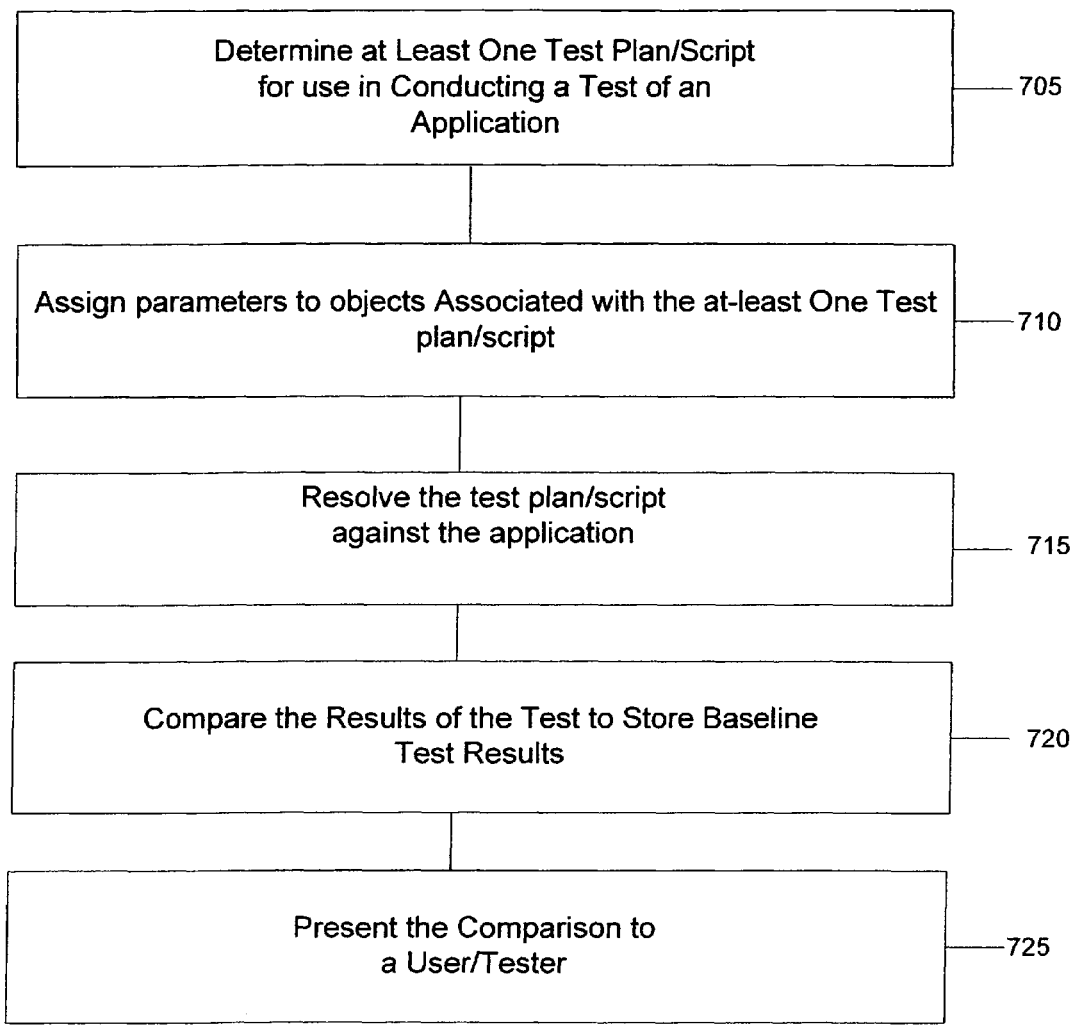
FIG. 7 illustrates a method 700 for testing an application, according to one embodiment of the invention.

FIG. 7 illustrates one embodiment of a method 700 for testing an application. At step 705, a determine is made regarding which test plan or script to use in testing an application. In some embodiments, the determination comprises receiving a signal from a user indicating the test plan or script to use. In some embodiments, the determination comprises determining whether a test plan or script for the application exists (e.g., stored in a database or other storage device). If so, the test plan(s) or script(s) may be retrieved and presented to the user for confirmation. In some embodiments, the determination step may comprise querying the user for a selection. At step 710, values and/or parameters may be assigned to objects associated with the at least one test plan or script. In some embodiments, values and/or parameters stored with or previously used in an earlier test may be used. In some embodiments, the user may be queried as to whether new values and/or parameters should be assigned. At step 715, the test plan(s) or script(s) may be resolved against the application. In some embodiments, a testing tool may be used to perform the navigation steps of the test plan(s) or script(s). At step 720, the results of the test may be compared with other test results, such as baseline test results that may be. In some embodiments, the baseline test results may relate, be associated with, or correspond to the particular test plan(s) or script(s). At step 725, the test results, baseline test results, and/or a comparison of the two may be presented to the user. In some embodiments, the test results, baseline test results, and/or a comparison of the two may be presented to the user via spreadsheet interface.

Figure 8:
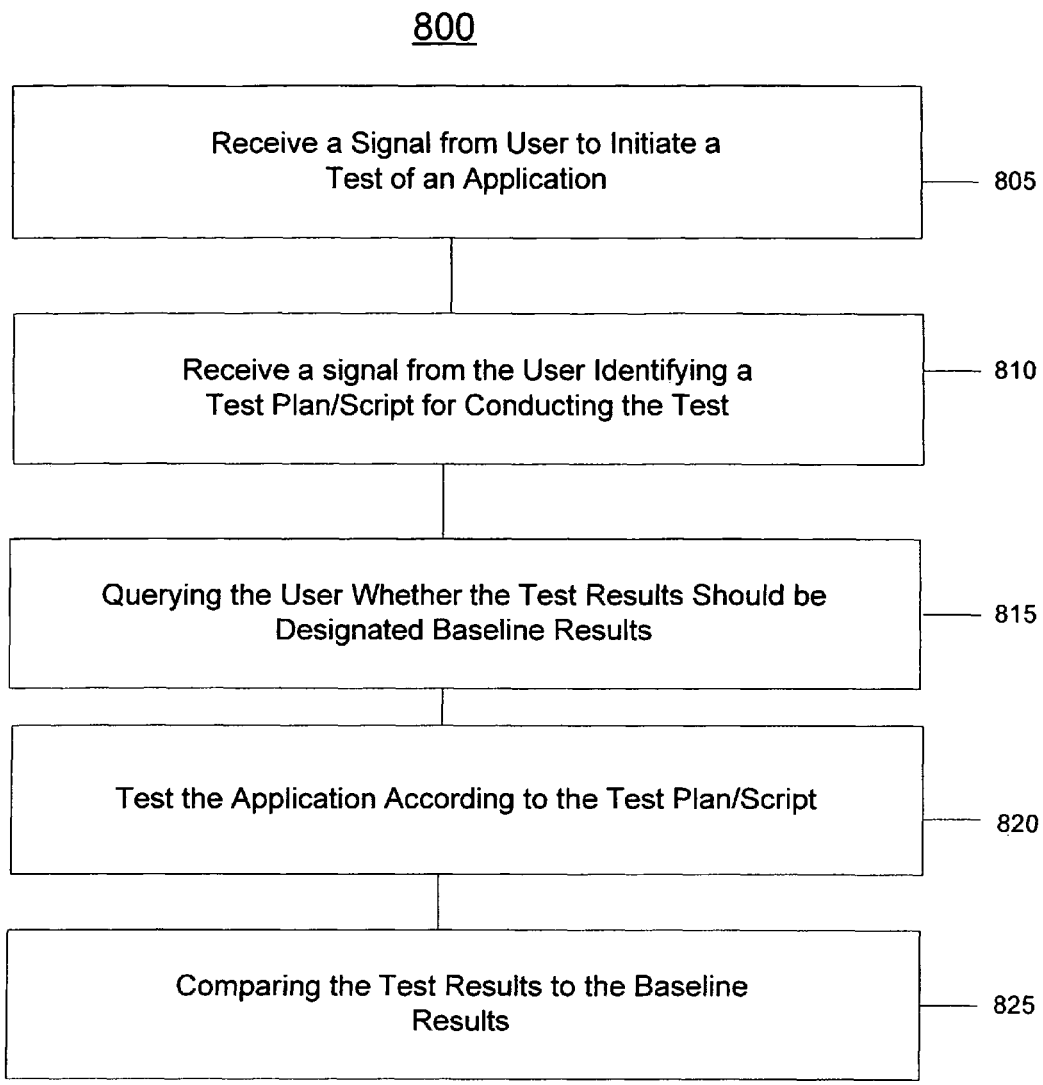
FIG. 8 illustrates a method 800 for testing an application, according to one embodiment of the invention.

FIG. 8 illustrates one embodiment of a method 800 for testing an application. At step 805, test control module 105 may receive a signal from a user to initiate a test of an application. In some embodiments, test control module 105 may be hosted by central test station 130, while in some embodiments it resides at the client station 110 of the user. At step 810, test control module 105 may receive a signal from the user identifying a test plan or script to use in conducting the test. In some embodiments, the test plan or script may stored in a database or other storage device, while in some embodiments it may be a newly created test plan or script. At step 815, the user may be queried as to whether the test results obtained (or to be obtained) should be designated baseline test results going forward. In some embodiments, test control module 105 may determine whether baseline test results exit for the particular test plan or script. In some embodiments, the determination step comprises determining whether a test plan or script for the application exists (e.g., stored in a database or other storage device). In some embodiments, the determination step may comprise querying the user for a selection.

At step 820, test control module 105 may initiate a test of the application according to the test plan or script. In some embodiments, test initiation may comprise directing a test tool to conduct the test. In some embodiments, initiating the test may also comprise converting data and information associated with the test plan or script to a format compatible with the particular test tool being used. At step 825, the test results obtained may be compared to baseline test results, if they exist.

Figure 9:
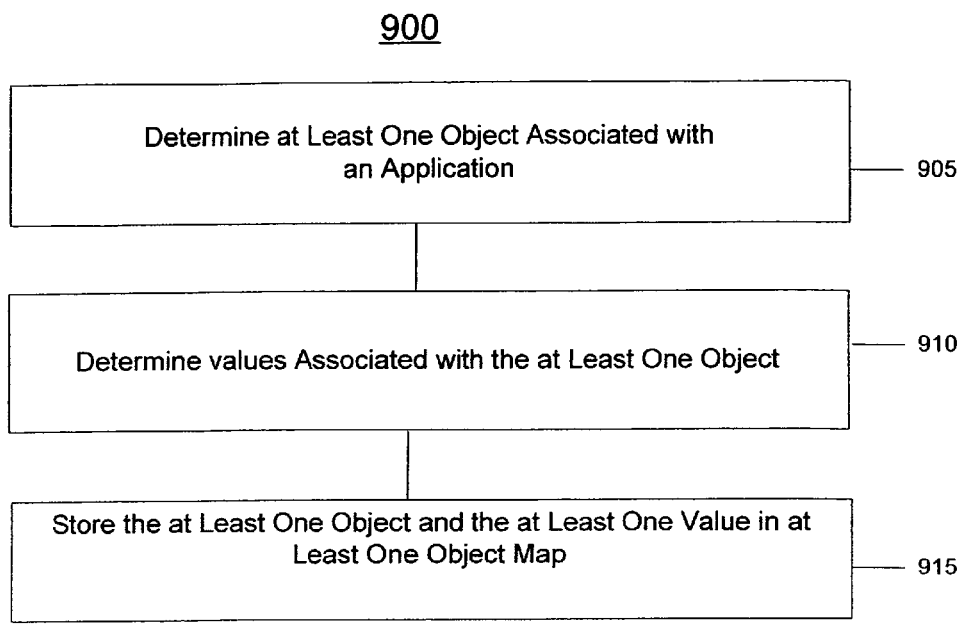
FIG. 9 illustrates a method 900 for defining objects, according to one embodiment of the invention.

FIG. 9 illustrates one embodiment of a method 900 for creating or defining an object or object map. In some embodiments, method 900 may be part of the test plan or script creation process described above. For example, a user may be interfacing with test control module 105 to create a test plan or script corresponding to a particular application. At step 905, test control module 105 may determine at least one object associated with the application. In some embodiments, such determination may comprise requesting the user to navigate the application so that test control module 105 or the test tool may scan the various screens to identify the various objects associated with the application. In some embodiments, the objects may be provided manually by the user. At step 910, test control module 105 or the test tool may also identify all values or parameters associated with the identified objects. For example, an object comprising of a drop-down box containing all 50 states of the United States would have as values or parameters the 50 states. In some embodiments, test control module 105 or the test tool may identify those values or parameters as being associated with the drop-down box object and may further store the objects in a storage device, such as a database, for example. At step 915, test control module 105 or the test tool may store the objects and associated values or parameters in an object map. In some embodiments, the objects, values or parameters, and/or the object map may by accessed by a user to create test plan(s) or script(s).

Figure 10:
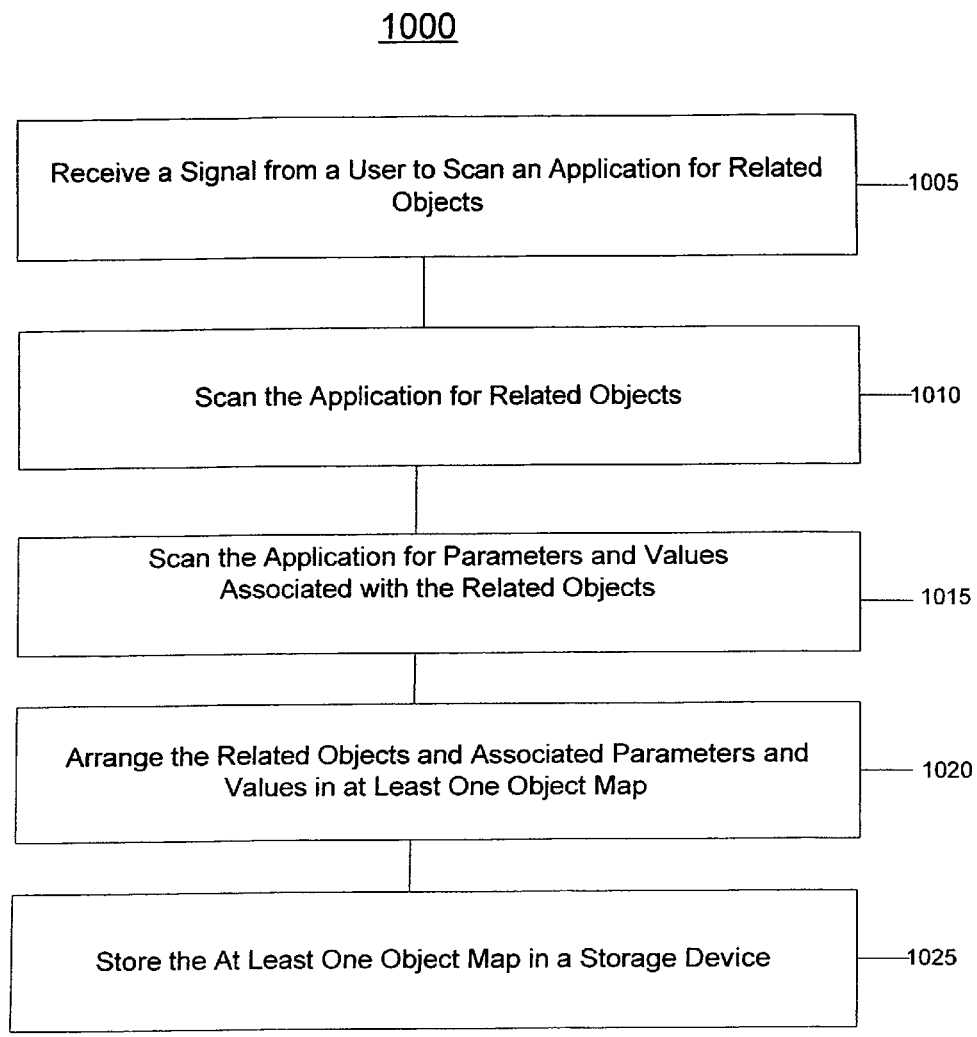
FIG. 10 illustrates a method 1000 for defining objects, according to one embodiment of the invention.

FIG. 10 illustrates one embodiment of a method 1000 for creating or defining an object or object map. At step 1005, test control module 105 may receive a signal from a user to scan an application for related objects. At step 1010, test control module 105 or test tool may scan the application for related objects. At step 1015, test control module 105 or test tool may scan the application for values or parameters associated with the related objects. In some embodiments, test control module 105 or the test tool may scan (or instruct the user to scan) the application (e.g. navigate the application's screens) to identify the related objects/and or related values or parameters. In some embodiments, the user may manually provide the related objects. At step 1020, test control module 105 or the test tool may arrange the related objects and associated parameters or values in at least one object map. At step 1025, test control module 105 or test tool may store the at least one object map in a storage device. In some embodiments, the at least one object map may be used by a user to create, revise or edit test plan(s) or script(s) associated with the application.

IV. Exemplary Interfaces

FIGS. 11-19 exemplify various screen shots (or graphical user interfaces (GUIs)) of spreadsheet interfaces that may enable interaction between users of system 100—e.g., agents of central test center 130 and users/testers of client stations 110—and the various modules and features described above. Other screen shots are possible.

FIG. 11 illustrates an illustrative interface 1100 comprising a table of contents for a particular test plan or script titled "Individual Cash Account Setup." As shown, interface 110 may include various particulars of the test plan or script, such as test type, estimated execution time, author, last updated, tester, total test cases, etc.

FIG. 12 illustrates an illustrative interface 1200 showing additional particulars of the test plan or script titled "Individual Test Account Setup." As shown, the test plan or script may comprise columns for step number, object name, method, parameter values, and/or description. As described above, a specific combination of method, objects and parameter specifies a particular action or step to be performed on the application. In some embodiments, a user may interact with interface 1200 to revise or edit the specific steps to perform as needed.

FIG. 13 illustrates an illustrative interface 1300 showing revisions to the test plan or script titled "Individual Test Account Setup." In some embodiments, drop-down menus may be associated with individual cells to enable the tester to efficiently modify parameters or values. For example, as shown in FIG. 13 the tester may selectively change the object titled to any of those displayed in the drop-down menu.

Figure 14:
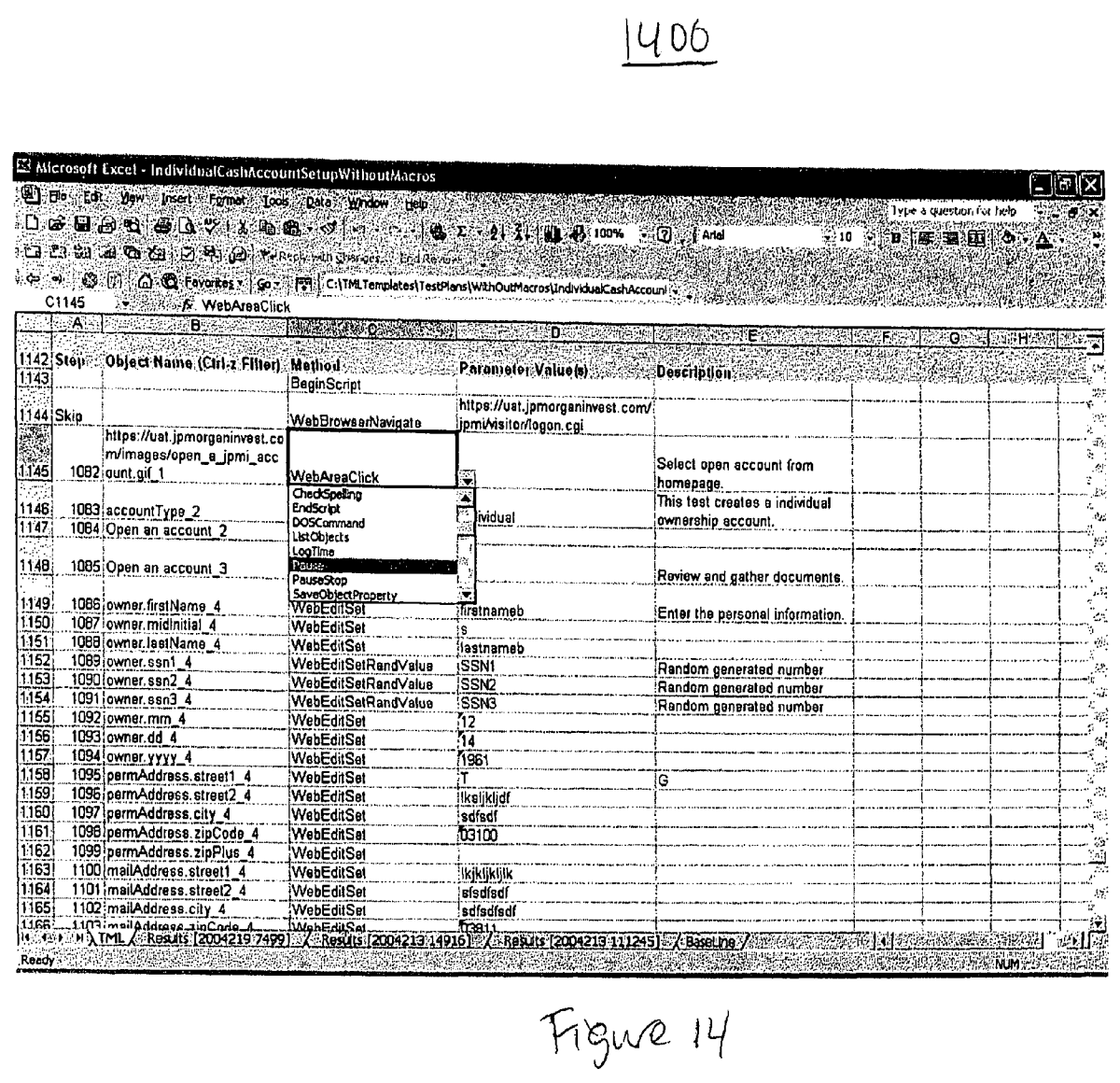

FIG. 14 illustrates an illustrative interface 1400 associated showing revisions to a method cell entry of test plan or script titled "Individual Test Account Setup."

Figure 15:
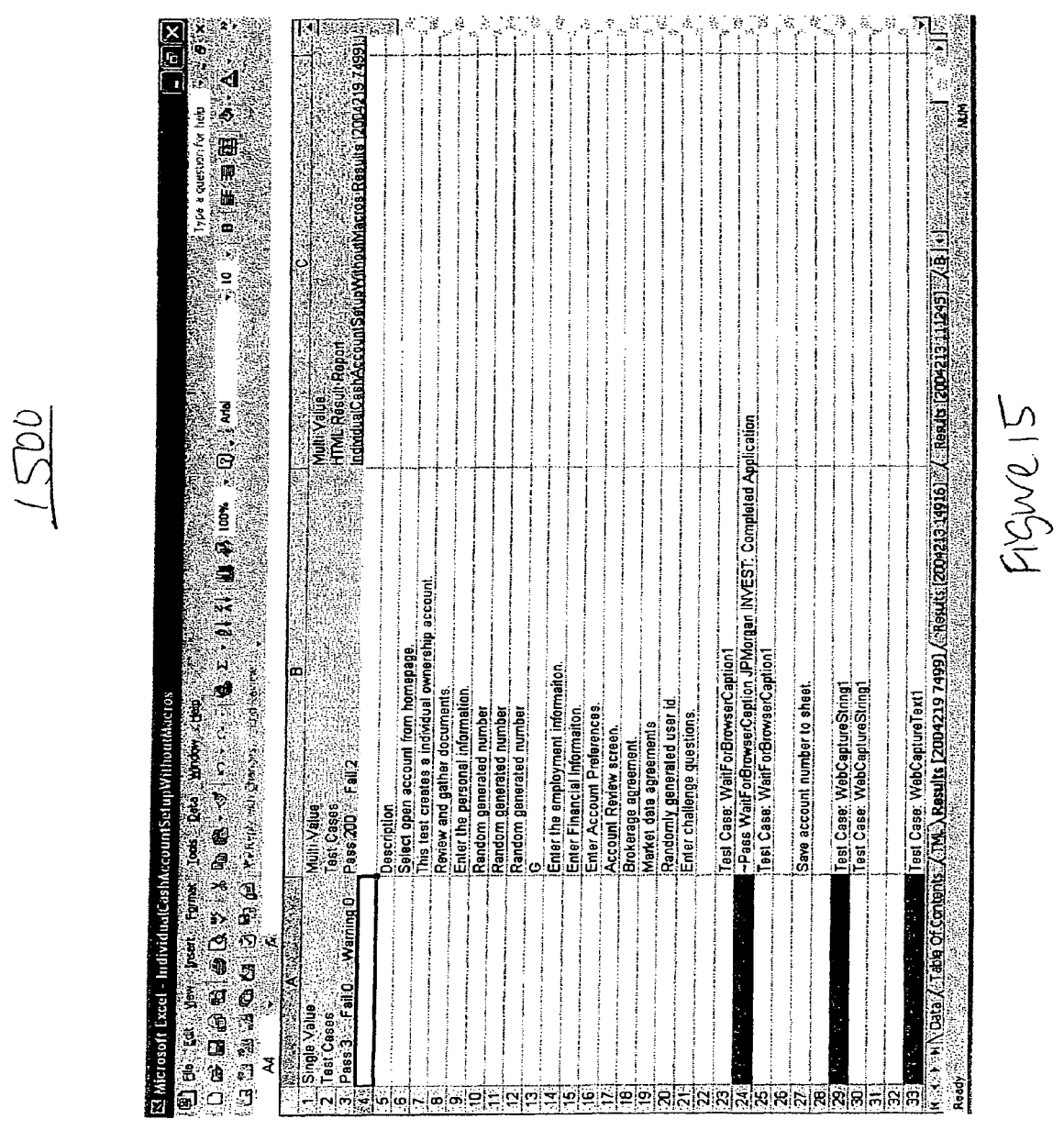

FIG. 15 illustrates an illustrative interface 1500 showing test results for testing conducted using the test plan or script titled "Individual Cash Account Setup." Column B represents test log results which is comprised of the executed test steps and test cases. Row 23-25 is an example of a test case where the testing tool is to wait for the browser caption to appear. The caption was displayed in the browser so the test case passed. The log continues to save the steps and test cases.

Figure 16:
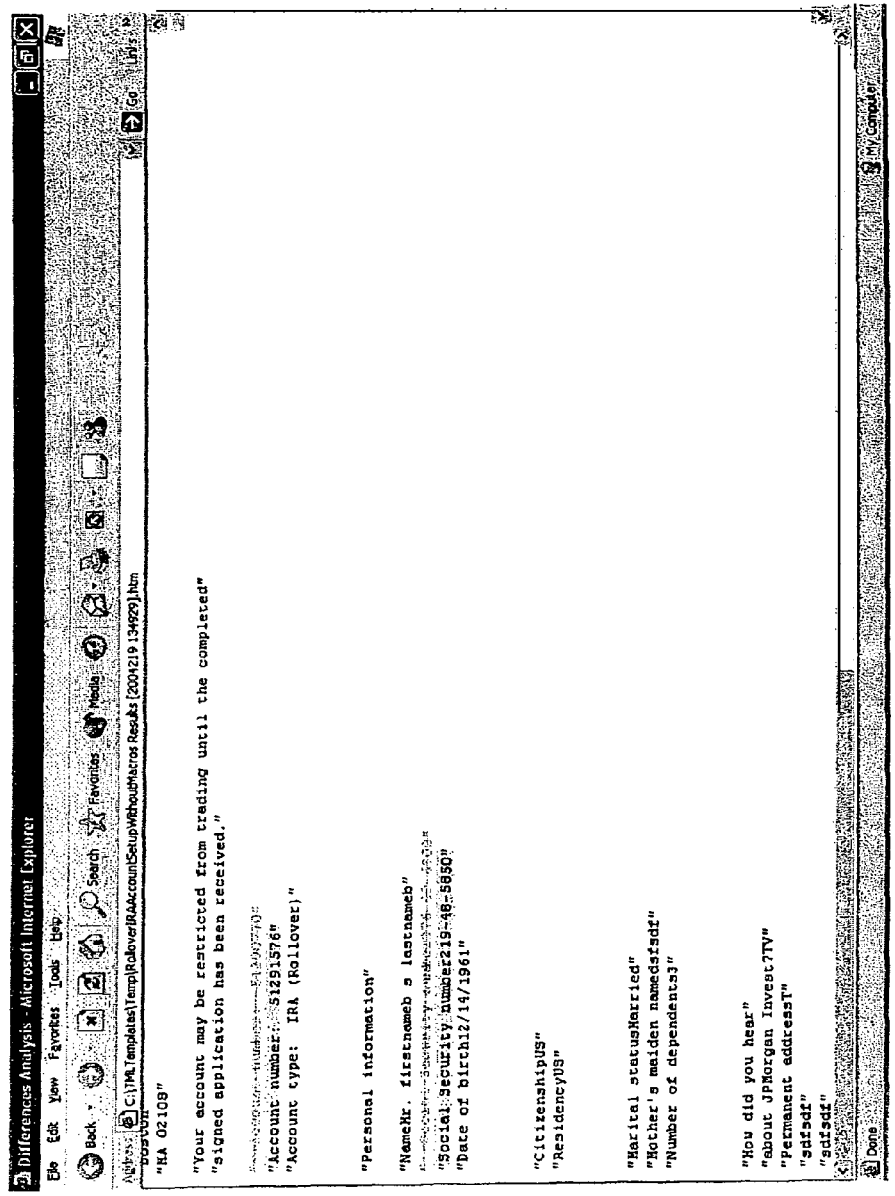
FIG. 16 illustrates an illustrative interface showing test results according to a particular test plan or script, according to one embodiment of the invention.

FIG. 16 illustrates an illustrative interface 1600 showing test results via a browser for testing conducted using a test plan or script. In particular, the figure shows the comparison of regression results sheet to the baseline sheet, thus giving the user/tester a "differences" analysis of the baseline to the latest results sheet. Some test case may be very large (e.g., capturing the text of a pdf), so aggregating the data on one or several sheet(s) makes it easier for the user to see why the test case failed.

Figure 17:
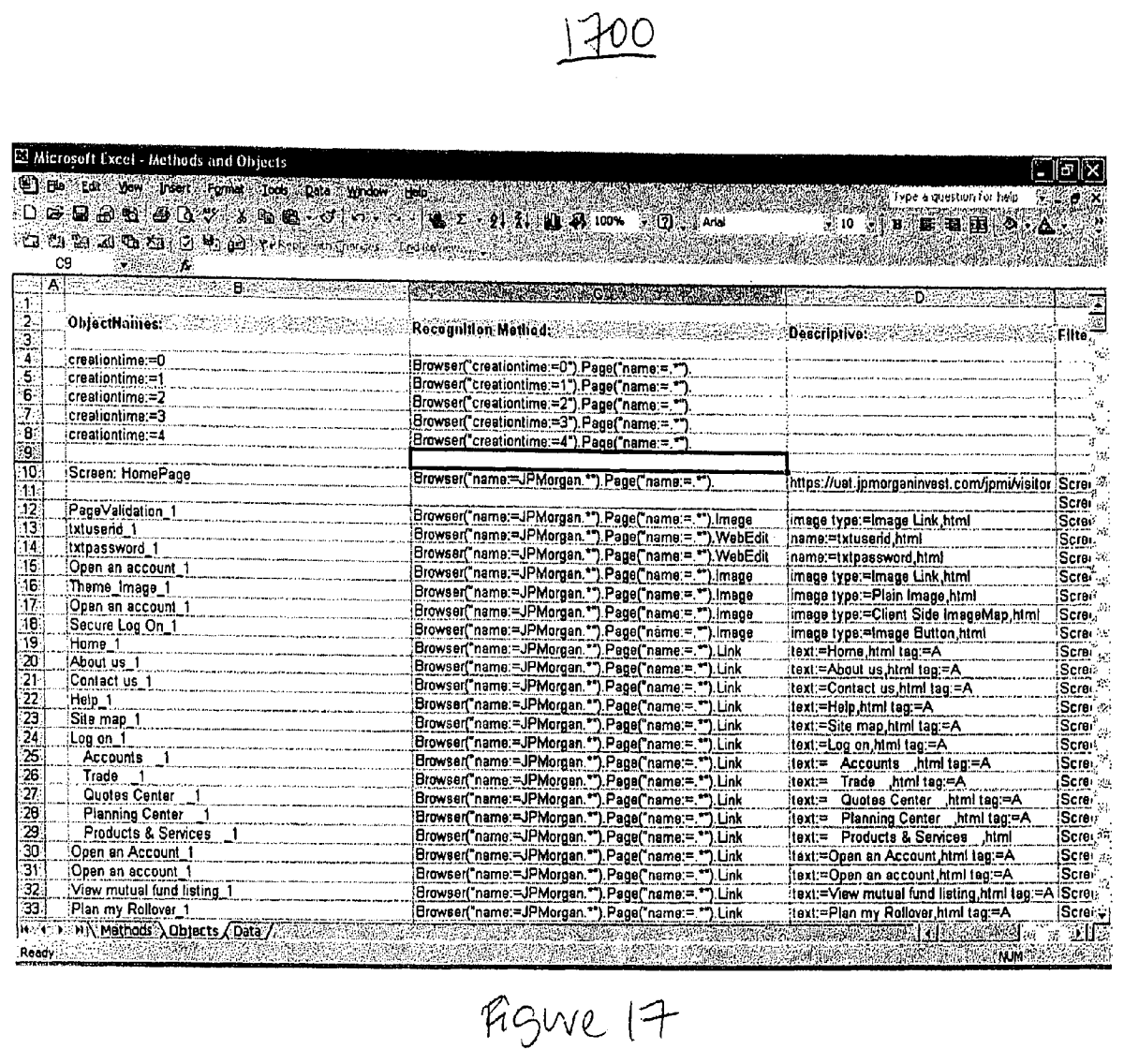

FIG. 17 illustrates an illustrative interface 1700 showing an object map. As shown, the object map may comprise an object name column, an recognition method column, and a descriptive column.

FIG. 18 illustrates an illustrative interface 1800 showing a method map. Similar to the object map in FIG. 17, this screen illustrates the methods available to the user/tester with examples. These methods are chosen via dropdowns during the test planning process.

Figure 19:
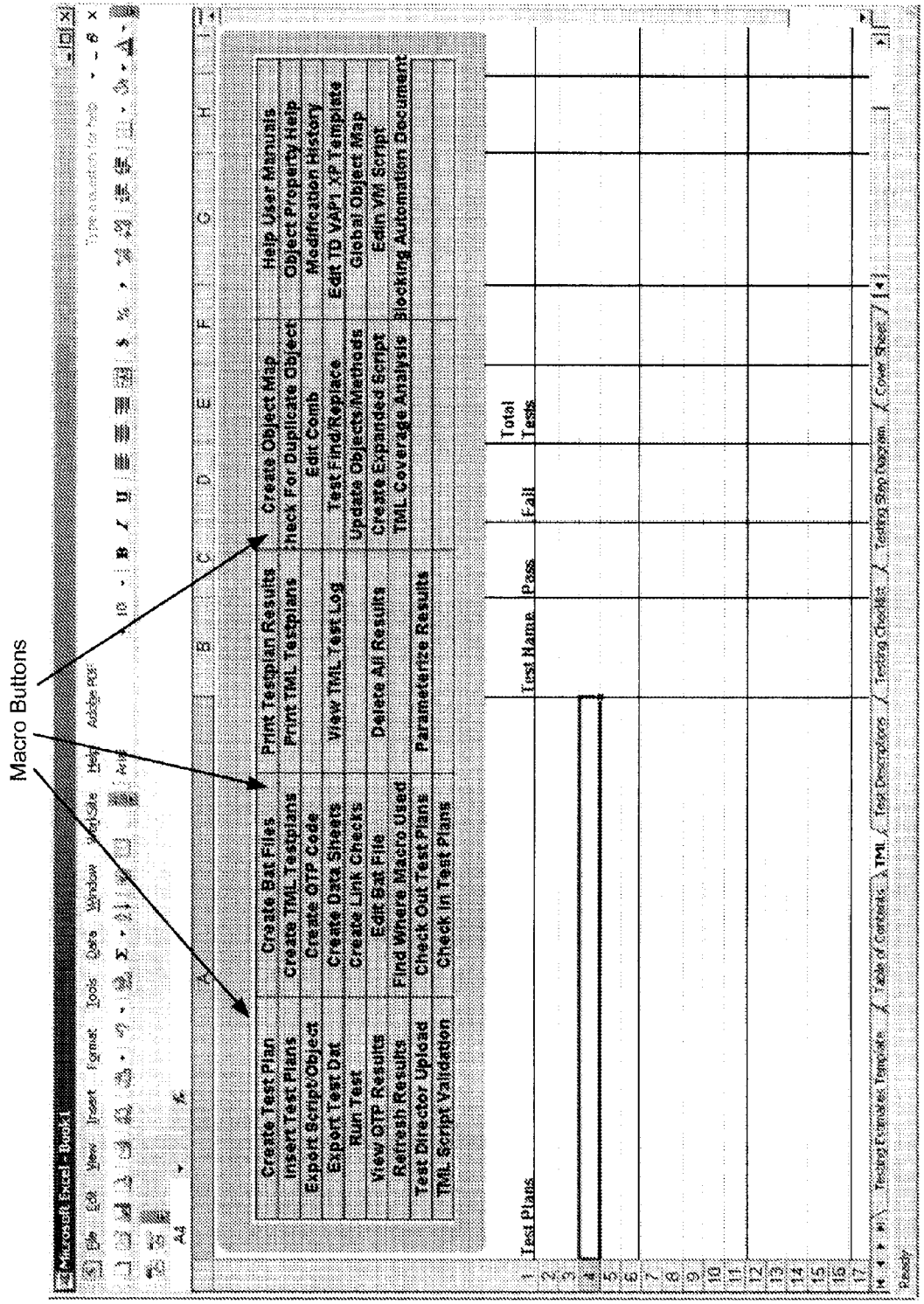
FIG. 19 illustrates an illustrative interface showing a summary of test plans or scripts, according to one embodiment of the invention.

FIG. 19 illustrates an illustrative interface 1900 showing a summary of test plans or scripts. In some embodiments, a summary page may include various utility functions that perform or carry out functions related to the various systems and methods described herein.

Other embodiments, uses and advantages of the present invention will be apparent to those skilled in the art from consideration of the specification and practice of the invention disclosed herein. The specification and examples should be considered exemplary only.

The invention claimed is:

1. A system for testing at least one application, comprising:
at least one processor; and
at least one storage medium storing instructions that, when executed by the at least one processor, enables a computer to perform the following:
creating at least one test plan comprising a test object, a test method and a test parameter;
identifying at least one object and a parameter each associated with the at least one application, the at least one object or parameter corresponding to the test object or test parameter, respectively, of the at least one test plan;
determining test results associated with testing of the at least one application according to the at least one test plan, the test results comprising: (1) baseline test results achieved by resolving the at least one test plan against the at least one application, and (2) regression test results achieved by resolving the at least one test plan against the at least one application;
identifying dynamic data to be parameterized;
automatically parameterizing the identified dynamic data associated with the at least one application;
determining changes in dynamic data associated with a failure associated with the at least one application by comparing the regression test results with the associated baseline test results; and
excluding from the determined changes in dynamic data those changes attributed to the parameterized dynamic data associated with the at least one application.

2. The system of claim 1 wherein data and information to conduct baseline and regression tests are received or obtained from a spreadsheet document or interface.

3. The system of claim 1 wherein the baseline or regression test results is/are presented to the user in a spreadsheet document or interface.

4. The system of claim 1 further comprising a test tool interface module for interfacing with a testing tool that conducts the tests according to the test plan, and for presenting and receiving test data and information from and to the testing tool.

5. The system of claim 1 further comprising an object determination module that determines at least one object associated with the at least one application, the at least one object being made available to the user for use during the test plan creation process.

6. The system of claim 1 further comprising an object value module that determines at least one value or parameter associated with the at least one object, the at least one value or parameter being made available to the user during the test plan creation process.

7. The system of claim 1 further comprising test plan-storage means for storing the at least one test plan.

8. The system of claim 1 wherein at least the test object and test method are in a first format when processed by a spreadsheet document, module or interface and in a second format when processed by a testing tool.

9. A computer-implemented method for testing at least one application, comprising:
creating, by at least one processor, at least one test plan comprising a test object, a test method and a test parameter;
identifying at least one object and a parameter each associated with the at least one application, the at least one object or parameter corresponding to the test object or test parameter, respectively, that comprises the at least one test plan;
conducting, by the at least one processor, a baseline test of the at least one application according to the at least one test plan, the baseline test being performed to obtain baseline results relating to the at least one application;
conducting, by the at least one processor, a regression test of the at least one application according to the at least one test plan, the regression testing being performed to obtain regression results relating to the at least one application;
receiving a parameterization signal including an identification of dynamic data to be parameterized;
automatically parameterizing the identified dynamic data associated with the at least one application;
determining changes in dynamic data associated with a failure associated with the at least one application by comparing the regression test results and associated with the baseline test results; and
excluding, from the determined changes in dynamic data those results attributed to the parameterized dynamic data associated with the at least one application.

10. The method of claim 9 further comprising the step of setting the regression results with the parameterized dynamic data as the baseline results.

11. The method of claim 9 further comprising searching a database for at least one test plan associated with the at least one application.

12. The method of claim 9 where data and information to conduct the baseline and regression tests are received from a spreadsheet document or interface.

13. The method of claim 9 wherein the baseline data and information, test results, or comparison is presented via a spreadsheet document or interface.

14. A system for testing at least one application or portion thereof, comprising:
a spreadsheet module for receiving and presenting test data and information from and to a user in a first format, the spreadsheet module comprising:
a test plan or script creation module for enabling the user to create at least one test plan or script for use in testing the at least one application or portion thereof, the at least one test plan or script comprising at least one object, at least one method, and at least one parameter, the at least one test plan or script being based on data and information received from the user by the spreadsheet module, the test plan or script creation module comprising:
an object module for defining at least one object associated with the at least one application or portion thereof, the object module comprising:
an object determination module for identifying or determining at least one object associated with the at least one application or portion thereof; and
an object parameter determination module for identifying or determining at least one parameter associated with the at least one object; and
an object map creation module for creating object maps; and
a method module for defining at least one method for testing the at least one object associated with the at least one application or portion thereof; and
a test results module for determining results associated with testing of the at least one application or portion thereof, and for presenting the test results to the user through the spreadsheet module, the test results module comprising:
a baseline test results module for determining baseline test results associated with the at least one application or portion thereof;
a regression test results module for determining regression test results; and
a comparison module for comparing the regression test results with the baseline test results;
a parameterization module for parameterizing dynamic data or objects associated with the at least one application or portion thereof and designate dynamic data or objects for which changes will be excluded from the results produced by the comparison module the dynamic data or objects being determined by the comparison;
an interpreter module for converting the test data and information between the first and a second format; and
a test tool interface module for interfacing with a testing tool and for presenting and receiving test data and information from and to the testing tool in the second format, the testing tool interfacing with the application or portion thereof to conduct the test.

15. The system of claim 1, wherein the comparison module avoids registering a failure if parameterized data differ between the baseline test results and the regression test results.

16. The system of claim 1, the processor receives an automatically generated parameterization signal to identify dynamic data.

17. The method of claim 9, further comprising allowing parameterized data to differ between the baseline test results and the regression test results without registering a failure.

18. The method of claim 9, further comprising receiving an automatically generated parameterization signal to identify dynamic data.

19. The method of claim 9, further comprising receiving a new baseline signal to set the regression results as a new baseline.

20. The system of claim 1, wherein the at least one test plan comprises a script.

21. The system of claim 1, wherein the at least one application is a portion of an application.

22. The system of claim 1, wherein the at least one application comprises one or more of a web site, web page, online content, and an interface.

23. The system of claim 1, wherein the object associated with the at least one application comprises one or more of a menu, a drop-down menu, a hyperlink, an address box, a uniform resource locator (URL), a search box, an icon, a radio button, and a screen element.

24. The system of claim 1, wherein the test parameter comprises a value.

25. The system of claim 1, wherein the parameter associated with the at least one test application comprises a value.

26. The system of claim 1, wherein the dynamic data comprises a dynamic object.

27. The method of claim 9, wherein the at least one test plan comprises a script.

28. The method of claim 9, wherein the at least one application is a portion of an application.

29. The method of claim 9, wherein the at least one application comprises one or more of a web site, web page, online content, and an interface.

30. The method of claim 9, wherein the object associated with the at least one application comprises one or more of a menu, a drop-down menu, a hyperlink, an address box, a uniform resource locator (URL), a search box, an icon, a radio button, and a screen element.

31. The method of claim 8, wherein the test parameter comprises a value.

32. The method of claim 9, wherein the parameter associated with the at least one test application comprises a value.

33. The method of claim 9, wherein the dynamic data comprises a dynamic object.

* * * * *